(12) United States Patent
Dooley et al.

(10) Patent No.: US 8,584,901 B2
(45) Date of Patent: Nov. 19, 2013

(54) POWDER DISPENSING APPARATUS

(75) Inventors: Christopher Dooley, New Canaan, CT (US); Loren Taylor, Chatham, NJ (US); Mark E. Hartelius, Chicago, IL (US)

(73) Assignees: Product Spring, LLC, New Canaan, CT (US); Taylored Concepts, LLC, Chatham, NJ (US); Hartdesign! Ltd., Orland Park, IL (US)

( * ) Notice: Subject to any disclaimer, the term of this patent is extended or adjusted under 35 U.S.C. 154(b) by 0 days.

(21) Appl. No.: 13/521,929

(22) PCT Filed: Aug. 3, 2011

(86) PCT No.: PCT/US2011/046436
§ 371 (c)(1),
(2), (4) Date: Jul. 12, 2012

(87) PCT Pub. No.: WO2013/019227
PCT Pub. Date: Feb. 7, 2013

(65) Prior Publication Data
US 2013/0032611 A1 Feb. 7, 2013

(51) Int. Cl.
*B67D 7/74* (2010.01)
*B67D 7/78* (2010.01)
*B67D 7/80* (2010.01)
*G01F 11/20* (2006.01)
*G01F 11/10* (2006.01)

(52) U.S. Cl.
USPC ............. 222/129.4; 222/145.4; 222/144; 222/146.5; 222/148; 222/239; 222/242; 222/367; 222/370; 222/63

(58) Field of Classification Search
USPC ........ 222/129.4, 145.5, 146.5, 239, 242, 367, 222/370, 63, 148, 144
See application file for complete search history.

(56) References Cited

U.S. PATENT DOCUMENTS

| | | | |
|---|---|---|---|
| 2,814,317 A * | 11/1957 | Gale | 141/103 |
| 3,266,670 A * | 8/1966 | Brooks et al. | 222/54 |
| 3,352,460 A | 11/1967 | Herring | |
| 3,884,389 A * | 5/1975 | Martin | 222/146.5 |
| 5,397,031 A | 3/1995 | Jensen | |
| 5,570,816 A | 11/1996 | LaBarbera, Jr. | |
| 5,626,260 A * | 5/1997 | Waldner | 222/144 |
| 5,671,325 A | 9/1997 | Roberson | |

(Continued)

FOREIGN PATENT DOCUMENTS

| | | |
|---|---|---|
| JP | 09-012066 A | 1/1997 |
| JP | 2007-186236 A | 7/2007 |
| KR | 10-2009-0022382 A | 3/2009 |

*Primary Examiner* — Kevin P Shaver
*Assistant Examiner* — Nicholas J Weiss
(74) *Attorney, Agent, or Firm* — Michael Crilly, Esquire

(57) ABSTRACT

A powder dispensing apparatus for dispensing a powder either with or without a liquid is presented. The apparatus includes a base, a dispenser, and a tower. The base is adapted for receiving a container. The dispenser includes a rotatable carriage contacting a support element with an opening. The carriage includes a plurality of compartments horizontally disposed above an optional funnel and rotatable about a central axis. A hopper is disposed above the carriage and communicates with less than all compartments. Each compartment is capable of separately dispensing a powder from the hopper through the opening into the funnel and thereafter into the container resting on the base. The tower is disposed between and attached at opposing ends to the base and the dispenser. The apparatus is useful, for example, in preparing baby formula and other food for infants, as well as in preparing food and drink for children and adults.

24 Claims, 34 Drawing Sheets

(56) References Cited

U.S. PATENT DOCUMENTS

| | | |
|---|---|---|
| 5,797,313 A | 8/1998 | Rothley |
| 6,173,117 B1 | 1/2001 | Clubb |
| 6,412,527 B1 | 7/2002 | Brice |
| 6,711,990 B1 | 3/2004 | Harrison |
| 6,766,106 B2 * | 7/2004 | Roberson ............... 392/442 |
| 6,829,431 B1 | 12/2004 | Haven et al. |
| 7,104,184 B2 | 9/2006 | Bidermann et al. |
| 7,316,249 B2 | 1/2008 | Cheong |
| 2005/0238341 A1 | 10/2005 | Thaler et al. |
| 2006/0150821 A1 | 7/2006 | Paul et al. |
| 2006/0157463 A1 * | 7/2006 | Wiele et al. ............ 222/146.5 |
| 2006/0278093 A1 | 12/2006 | Bidermann et al. |
| 2010/0282781 A1 * | 11/2010 | Kinzie et al. ............ 222/239 |

* cited by examiner

POWDER DISPENSING APPARATUS

CROSS REFERENCE TO RELATED APPLICATIONS

This application is based upon and claims priority from Patent Cooperation Treaty Application No. PCT/US2011/046436 filed Aug. 3, 2011, entitled Powder Dispensing Apparatus, which is hereby incorporated in its entirety by reference thereto.

FEDERALLY SPONSORED RESEARCH AND DEVELOPMENT

None.

BACKGROUND OF THE INVENTION

1. Field of the Invention

The present device generally relates to a powder dispensing apparatus. Specifically, the dispensing apparatus includes a base and a dispenser attached at opposite ends of a vertically disposed tower. The base is adapted for receiving a container. The dispenser includes a rotatable carriage with a plurality of compartments. The rotatable carriage is either manually operable or motorized. Each compartment is capable of separately dispensing a predetermined quantity of powder into a funnel either without or with a liquid before delivery into the container resting on the base.

2. Background

A variety of powder dispensers are known within the beverage arts. Several exemplary devices are noteworthy.

Cheong describes an apparatus in U.S. Pat. No. 7,316,249 for dispensing infant formula, and in particular an apparatus that is able to contain and mix temperature controlled water with milk powder based on the amount of infant formula desired and ideally is also capable of sterilizing bottles prior to dispensing.

Haven et al. describes an apparatus in U.S. Pat. No. 6,829,431 for automatically dispensing the proper amounts of dry baby formula and heated water to make liquid infant formula. The baby bottle is held in place in a pivoting transfer arm with a clip that fastens around the neck of the bottle. After the powdered formula is dispensed, the transfer arm swings the bottle to the water dispensing station. Water heated to the desired temperature is added to the bottle, and the formula is ready to be mixed and served.

Harrison et al. describes a dispensing apparatus in U.S. Pat. No. 6,711,990 including a base housing having side and bottom walls, and also having an open top, and further having container assembly support members disposed therein. The apparatus also includes a container assembly including a container, and also including a hood being securely and conventionally attached about the container, and further including a bottle support member being securely and conventionally attached to the container, and also including bottle retaining members being securely and conventionally attached to the bottle support member; and further includes a cover being removably disposed over the open top of the container; and also includes a light-emitting assembly being securely fastened attached to the container assembly; and further includes a baby formula preparation and dispensing assembly for preparing baby formula and for dispensing the baby formula to bottles.

Brice describes an automated baby formula bottle filler in U.S. Pat. No. 6,412,527 for providing formula for a baby's bottle from powdered formula. The automated baby formula bottle filler includes a housing having an interior space for holding water. A motor compartment coupled to the housing is positioned in the interior space. A first funnel assembly is positioned in the interior space for dispensing baby formula powder. A second funnel assembly is positioned in the interior space for dispensing water. A control panel is coupled to the housing. The control panel includes a powdered formula dispenser control and a water dispenser control.

Clubb describes a heated beverage machine in U.S. Pat. No. 6,173,117 for use in making heated beverages, such as baby formula and cocoa, from heated water and a powdered drink mix that includes a housing having contained therein water dispensing assembly, a powdered drink mix dispensing assembly, and a control circuit. The water dispensing assembly includes a water reservoir, a water reservoir level sensor, a water temperature sensor, three fluid volume select input buttons, a warm/hot select switch, a water dispensing valve in connection between the water reservoir and a mixing nozzle, resistance heating element, a water temperature display gauge, a water level display gauge, a warm temperature select indicator light, and a hot temperature select indicator light. The powdered drink mix dispensing assembly includes a powdered drink mix reservoir, a dispensing auger positioned within a dispensing pipe in connection between the mixing nozzle and the powdered drink mix reservoir, a dispensing auger position sensor, a shaker assembly positioned within the powdered drink mix reservoir, and a dispensing auger motor. The control circuit has inputs in electrical connection with a water reservoir level sensor, a water temperature sensor, a dispensing auger position sensor, three fluid volume select input buttons, a warm/hot select switch, and on/off switch, a start mix switch, and outputs in connection with a water dispensing valve, a resistance heating element, a water temperature display gauge, a water level display gauge, a dispensing auger motor, a warm temperature select indicator light, and a hot temperature select indicator light. The control circuit operates the dispenser auger motor and the water dispensing valve such that the volume of powdered drink mix and water dispensed corresponds with the volume of the fluid volume select input button selected in response to activation of the start mix switch. The control circuit operates the resistance heating element to heat dispensed water exiting the water dispensing valve to the temperature corresponding to the position of the warm/hot select switch before the dispensed water reaches the mixing nozzle. The mixing nozzle is positioned outside of the housing and includes a dispensing opening for dispensing a mixture of the dispensed water and powdered beverage mix.

Rothley describes an electronic baby formula preparation and storage device in U.S. Pat. No. 5,797,313 including a housing for securely receiving and supporting a baby-feeding bottle. A reservoir is mounted on the housing for storing a measured volume of water and is in fluid communication with the bottle. A timer means releases the volume of water into the bottle at a preselected time during a baby-feeding cycle. Simultaneously with the release of the water from the reservoir, a mixing means, operatively associated with the bottle, is activated to agitate the water with a volume of formula that was previously inserted into the bottle. A heating means, under the control of a temperature sensor, warms the formula mixture to a desired temperature and maintains the formula mixture at that temperature for a preselected period of time.

Roberson describes a free-standing apparatus in U.S. Pat. No. 5,671,325 that stores and heats a supply of water in a reservoir to a temperature desirable for instant consumption by an infant. The apparatus is portable and especially adapted to dispense warm water into a standard baby bottle that is then mixed with powdered baby formula for instant feeding. The apparatus includes controls for ensuring that water in the reservoir does not exceed or overshoot a maximum safe temperature for feeding formula to an infant. Visual indicator that the temperature of the water is in a safe range is provided to reassure the caregiver of proper temperature. The size of the reservoir is limited to prevent stagnation of water while providing sufficient volume to a hold a supply of water for one night of feedings.

LaBarbera, Jr. describes a device in U.S. Pat. No. 5,570,816 used for making and combining warm sterile water with dry baby formula. Device must contain a source of water, enough to fill at least one bottle to desired amount and to properly combine with formula. A heating device is contained in order to sterilize water by boiling it. A cooling device within the unit brings down the temperature of the water to recommended mixing temperature with dry formula. Enough dry formula is contained to produce at least one bottle. A releasing device is provided to release recommended amounts of both water and dry formula directly into a bottle.

Jensen describes a baby milk warmer in U.S. Pat. No. 5,397,031 including a housing for supporting a bottle of water and a heater for heating selected amounts of water. A flexible tube is provided for interconnecting the bottle and the heater and a metering valve is disposed between the bottle and the heater, allowing one of the selected amounts of water to enter the heater. A sensor is provided and disposed within the flexible tube upstream from the metering valve for sensing the temperature of water entering the metering valve. A control system, responsive to a manual switch for designating one of the selected amounts of water, is provided for running the heater for a sufficient time to warm one of the selected amounts of water to a selected temperature.

Herring describes a sanitary device in U.S. Pat. No. 3,352,460 for storing components of a liquid infant formula in which at least one of the liquid components is refrigerated and all of the components are jointly dispensed to a baby's bottle.

Biderman et al. describes devices in U.S. Pat. No. 7,104,184 and U.S. patent application Ser. No. 11/499,690 for preparing a fluid food at a desired consumption temperature on demand, comprising two reservoirs of water, a container containing a formula, a data processor and a controller for dispensing water of the correct temperature from each of the reservoirs and the formula from the container into a vessel.

Thaler et al. describes an apparatus in U.S. patent application Ser. No. 10/821,506 for quickly and easily preparing a bottle of infant formula from powdered formula and water. The device warms the water contained in a baby bottle placed therein to a temperature substantially in a range around body temperature and keeps the water warmed to that temperature. The device further contains a dispensing mechanism allowing the quick and accurate dispensing of the required amount of formula into the baby bottle. Such apparatus succeeds in substantially reducing the time and effort associated with baby formula preparation. This device would be ideal for late night situations so the user is not required to partake in multiple time consuming tasks to prepare a baby bottle.

As is readily apparent from the discussions above, the related arts do not include a powder dispenser capable of dispensing a predetermined amount of a powdered food or the like in a convenient, controllable and efficient manner either without or with a liquid.

Therefore, what is required is a dispensing apparatus capable of conveniently, controllably and efficiently dispensing a food item in powder form into a container either without or with a liquid.

SUMMARY OF THE INVENTION

An object of the present invention is to provide a dispensing apparatus capable of conveniently, controllably and efficiently dispensing a consumable in powder form into a container either without or with a liquid.

In accordance with some embodiments, the powder dispensing apparatus includes a base, a dispenser, and a tower. The base is adapted for receiving a container. The dispenser includes a rotatable carriage horizontally disposed above an optional funnel and rotatable about a center axis. The rotatable carriage further includes a plurality of compartments capable of separately dispensing a predetermined quantity of powder through the funnel into the container. The tower is disposed between and attached to the base and the dispenser.

In accordance with other embodiments, the powder dispensing apparatus could further include a handle attached and rotatable with respect to the dispenser. The handle communicates with the rotatable carriage so that the rotatable carriage is operable.

In accordance with other embodiments, the powder dispensing apparatus could further include a motor disposed within and attached to the apparatus and communicating with the rotatable carriage so that the rotatable carriage is operable via the motor.

In accordance with other embodiments, the powder dispensing apparatus could further include a control panel disposed along an exterior surface of the apparatus. The control panel communicates with and controls operability of the motor.

In accordance with other embodiments, each compartment could further include a rotatable paddle disposed along a lower side of the compartment and attached and rotatable with respect to the compartment. Each rotatable paddle rotates to an OPEN position when positioned above the container so that the powder feeds into the funnel.

In accordance with other embodiments, the rotatable carriage could vibrate during rotation to facilitate release of the powder from each compartment.

In accordance with other embodiments, the rotatable carriage could include a plurality of first nubs which interact with at least one second nub fixed to the dispenser so as to vibrate the rotatable carriage.

In accordance with other embodiments, each compartment could be attached to a live hinge adjacent to the center axis so as to allow only the compartment contacting one or more second nubs to vibrate.

In accordance with other embodiments, the dispenser could include a threaded shaft attached to and rotatable with respect to the dispenser and a wall. The platen could push or feed the powder toward and into the compartments when the threaded shaft is rotated. The threaded shaft also includes a gear adjacent to the rotatable carriage which engages a ring along the rotatable carriage so as to rotate with the rotatable carriage.

In accordance with other embodiments, the powder dispensing apparatus could further include a rotatable handle attached and rotatable with respect to the dispenser. The rotatable handle facilitates operability of the carriage and the platen.

In accordance with other embodiments, the powder dispensing apparatus could further include a motor disposed within and attached to the apparatus. The motor facilitates operability of the platen.

In accordance with other embodiments, the base could be foldable with respect to the tower.

In accordance with other embodiments, the powder dispensing apparatus could further include a reservoir and a pump. The reservoir could be attached to the apparatus and adapted to store a liquid. The pump could communicate with reservoir and move the liquid from the reservoir to the funnel.

In accordance with other embodiments, the pump could transport the liquid into the funnel when the rotatable carriage communicates the powder to the funnel, thereby mixing the liquid and the powder within the funnel.

In accordance with other embodiments, the funnel could include at least two ports which facilitate injection of the liquid into the funnel and cleaning of the funnel after the liquid and the powder are mixed.

In accordance with other embodiments, the powder dispensing apparatus could further include a rotatable handle attached and rotatable with respect to the dispenser to control the operability of the rotatable carriage and the pump.

In accordance with other embodiments, the powder dispensing apparatus could further include a motor disposed within and attached to the apparatus. The motor also communicates with the rotatable carriage and the pump so that each is operable via the motor.

In accordance with other embodiments, the powder dispensing apparatus could further include a control panel disposed along an exterior surface of the powder dispenser apparatus. The control panel communicates with and controls operability of the motor.

In accordance with other embodiments, the powder dispensing apparatus could further include a heating element disposed within the apparatus capable of heating the liquid prior to mixing with the powder.

In accordance with other embodiments, the powder dispensing apparatus could further include a control panel which communicates with and controls operability of the heating element.

In accordance with other embodiments, the powder dispensing apparatus could further include at least one sensor disposed within the apparatus to measure the temperature of the liquid so as to allow control of the heating process.

In accordance with other embodiments, the reservoir could be insulated.

In accordance with other embodiments, the powder dispensing apparatus could further include a sensor disposed within the reservoir that prevents operability of the motor when the liquid within the reservoir is below a predetermined level.

In accordance with other embodiments, the reservoir is separable from the powder dispensing apparatus.

Several advantages are offered by the described invention. The powder dispensing apparatus is capable of dispensing a predetermined quantity of a consumable powdered in a convenient, controllable, precise, and efficient manner into a container either without or with a liquid. The rotatable carriage within the powder dispensing apparatus vibrates so as to ensure release of the powder from a compartment into a container. The base is foldable with respect to the tower allowing for more compact storage. The funnel within the dispenser ensures efficient mixing of a powder and a liquid prior to communication into a container. Arrangement of ports along the funnel allows cleaning thereof after powder and liquid are properly mixed. Other advantages are described throughout the disclosure.

BRIEF DESCRIPTION OF THE INVENTION

Additional aspects, features, and advantages of the invention will be understood and will become more readily apparent when the invention is considered in the light of the following description made in conjunction with the accompanying drawings.

FIG. 10b is a side view showing interaction between first and second nubs which push the rotatable carriage up and away from the support element as further illustrated in FIG. 10a.

FIG. 11b is a partial section view illustrating attachment of rotatable paddle to the inner and outer walls of a compartment with a gear attached at one end of the rotatable paddle adjacent to the outer wall as further illustrated in FIG. 11a.

FIG. 12b is a schematic diagram illustrating arrangement between adjacent rotatable paddles with respect to an opening and actuation bracket which ensures that only one paddle is OPEN at a time as further illustrated in FIG. 12a.

FIG. 16b is a bottom perspective view illustrating cup-shaped section with opening, handle, flange, and plurality of ports as further illustrated in FIG. 16a.

FIG. 20b is a section view illustrating interaction between bosses extending outward from the walls of the base and tracks extending inward from the walls of the tower as further illustrated in FIG. 20a.

FIG. 20c is a side view with partial cutaway view illustrating powder dispensing apparatus with foldable base retracted and folded with respect to the apparatus as further illustrated in FIG. 20a.

DETAILED DESCRIPTION

Figure 1:
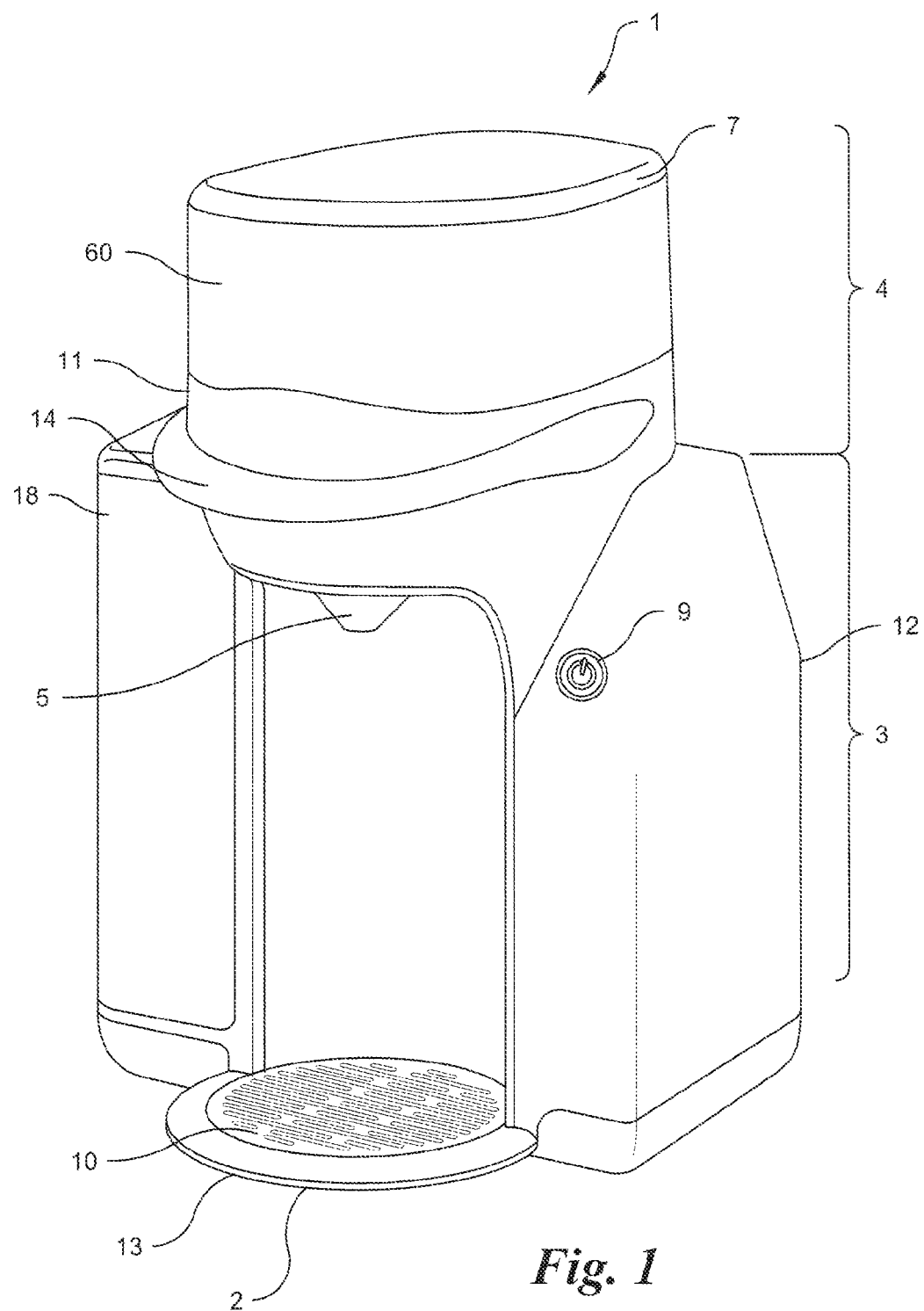
FIG. 1 is a perspective view illustrating arrangement of base, tower, and dispenser with funnel, handle and cover in accordance with an embodiment of the apparatus.

Reference will now be made in detail to several preferred embodiments of the invention that are illustrated in the accompanying drawings. Wherever possible, same or similar reference numerals are used in the drawings and the description to refer to the same or like parts or steps. The drawings are in simplified form and are not to precise scale. The words communicate, connect, couple, link, and similar terms with their inflectional morphemes do not necessarily denote direct and immediate connections, but also include connections through intermediary elements or devices.

Referring now to FIG. 1, a powder dispenser apparatus 1 is shown including a base 2 and a dispenser 4 attached at opposite ends of a substantially vertically disposed tower 3.

Figure 9:
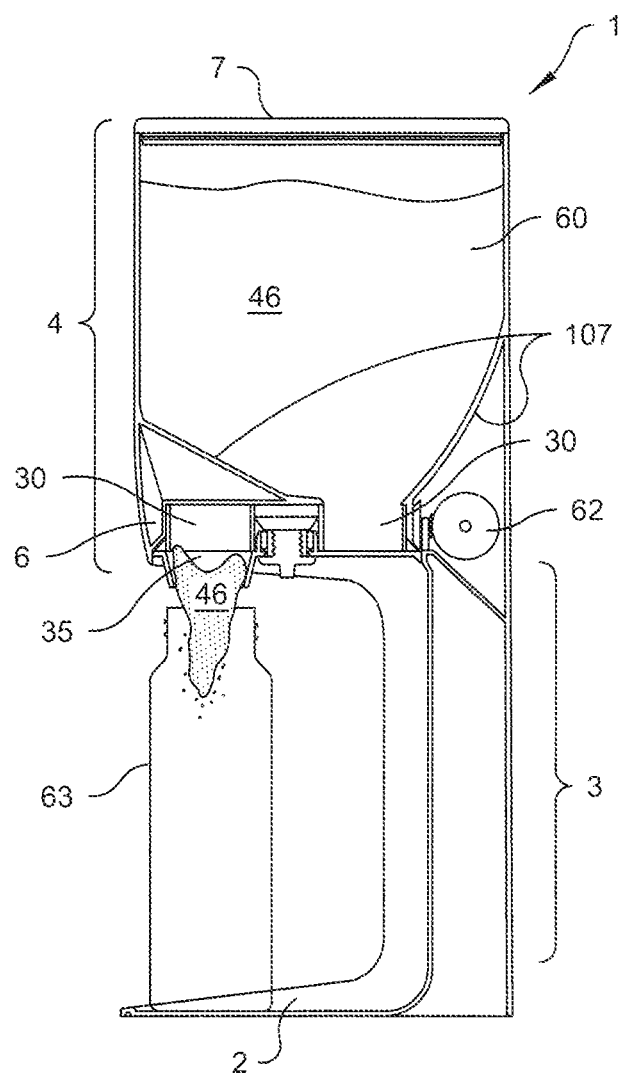
FIG. 9 is a partial section view illustrating hopper within dispenser and dispensing of a powder from rotatable carriage to container positioned within the base in accordance with an embodiment of the apparatus.

The base 2 is a generally planar element adapted to receive and hold a container 63, one non-limiting example being a baby bottle, as further illustrated in FIG. 9. The base 2 includes a housing 13 which could be fabricated of a polymer via injection molding techniques understood in the art. The dimensional properties of the base 2 should ensure proper support of the powder dispenser apparatus 1 to avoid tip over. The base 2 could also include a grate 10 which allows the base 2 to function as a spill tray.

The tower 3 is a vertically disposed element which separates the dispenser 4 from the base 2 and properly supports and aligns the dispenser 4 above the base 2. The height of the tower 3 is design dependent and dictated by the maximum height of a container 63 intended for use with the power dispensing apparatus 1. The tower 3 includes a housing 12 which could include, but is not limited to, a tube-like structure having a rectangular, square, or circular cross section. The housing 12 could be fabricated of a polymer via injection molding techniques understood in the art. The tower 3 could be attached to the base 2 via techniques understood in the art including, but not limited to, mechanical fasteners, adhesive, or ultrasonic welds. In some embodiments, the tower 3 could include or function as a reservoir adapted to hold a liquid, as described further herein. A button 9 could be provided along the housing 12 facilitating ON and OFF functionality when the powder dispensing apparatus 1 includes one or more electrically powered elements.

The dispenser 4 includes a housing 11 also composed of a polymer fabricated via techniques understood in the art. The housing 11 could include an infinite number of aesthetically pleasing designs. In some embodiments, a rotatable handle 14 could be attached to the dispenser 4 at one end so as to be freely rotatable above or at the top of the dispenser 4. The dispenser 4 could also include a hopper 60 and rotatable carriage 6, the latter not shown, disposed within the housing 11. The dispenser 4 could further include a cover 7 attached or attachable to the housing 11 so as to allow access to the area immediately above the rotatable carriage 6 for the purpose of refilling the powder dispensing apparatus 1 with powder and/or liquid. The cover 7 could be completely removable from the housing 11 or attached to the housing 11 in a hinged arrangement. The dispenser 4 could also include a funnel 5 which is either removably attached to the dispenser 4 or fixed thereto. In alternate embodiments, the dispenser 4 could further include a pump 8, the latter not shown. The pump 8 could extend from the dispenser 4 so as to be insertable into the tower 3 or a reservoir 18 immediately adjacent to the tower 3. In other embodiments, the rotatable carriage 6, cover 7, and/or hopper 60 could be attached to or arranged in a stacked configuration within the powder dispensing apparatus 1 so as to be removable for cleaning purposes.

The powder dispensing apparatus 1 could also include a reservoir 18. The reservoir 18 could reside along the exterior of the tower 3 as represented in FIG. 1 or be disposed within or comprising the tower 3 as further described herein. The tower 3 could be fixed to the powder dispensing apparatus 1 or attached to the powder dispensing apparatus 1 in a removable fashion.

Figure 2:
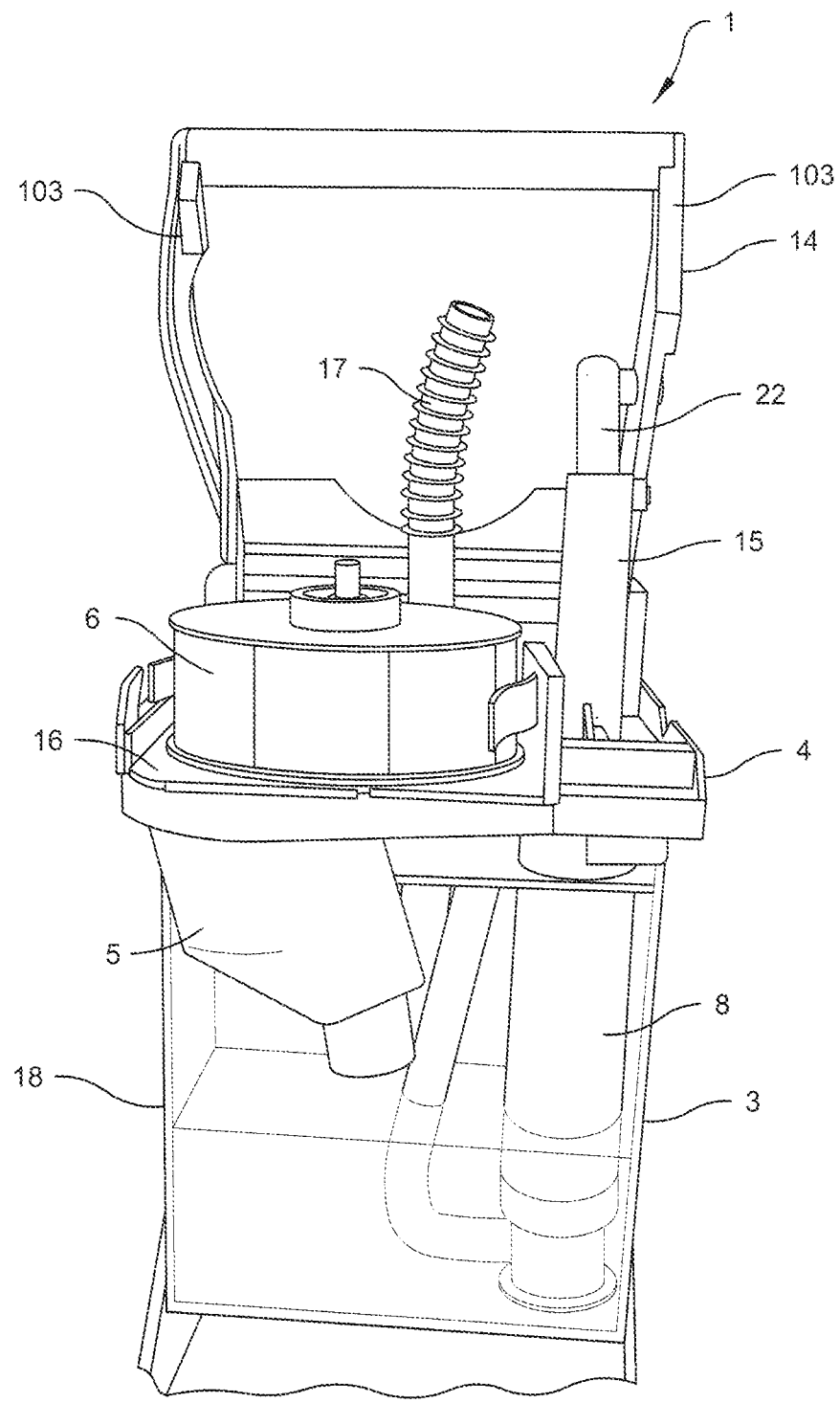
FIG. 2 is a front view illustrating elements along the interior and exterior of a powder dispensing apparatus including rotatable handle, rotatable carriage, pump, funnel, and reservoir in accordance with an embodiment of the apparatus.
Figure 3:
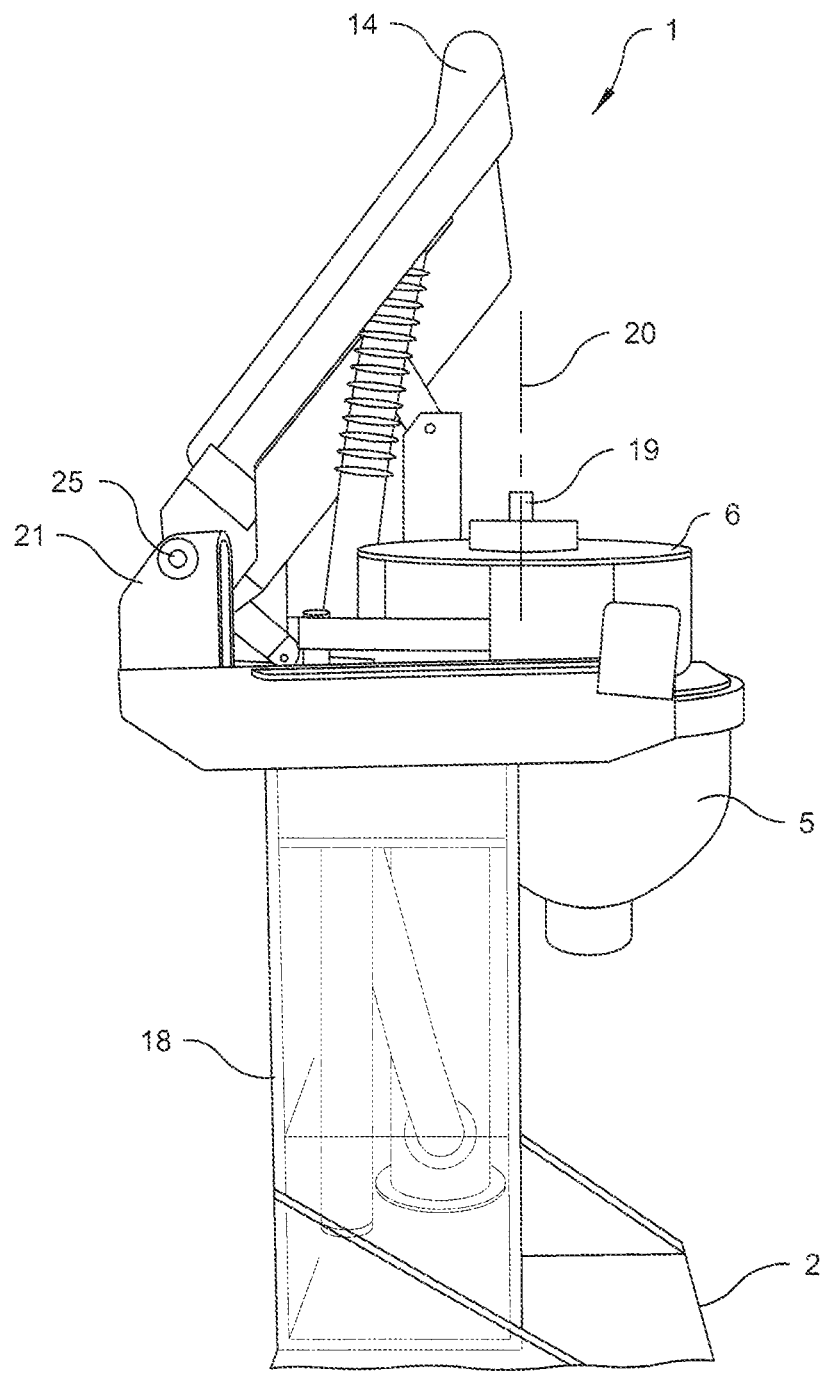
FIG. 3 is a left side view illustrating elements along the interior and exterior of a powder dispensing apparatus including rotatable handle, rotatable carriage, pump, funnel, and reservoir in accordance with an embodiment of the apparatus.
Figure 4:
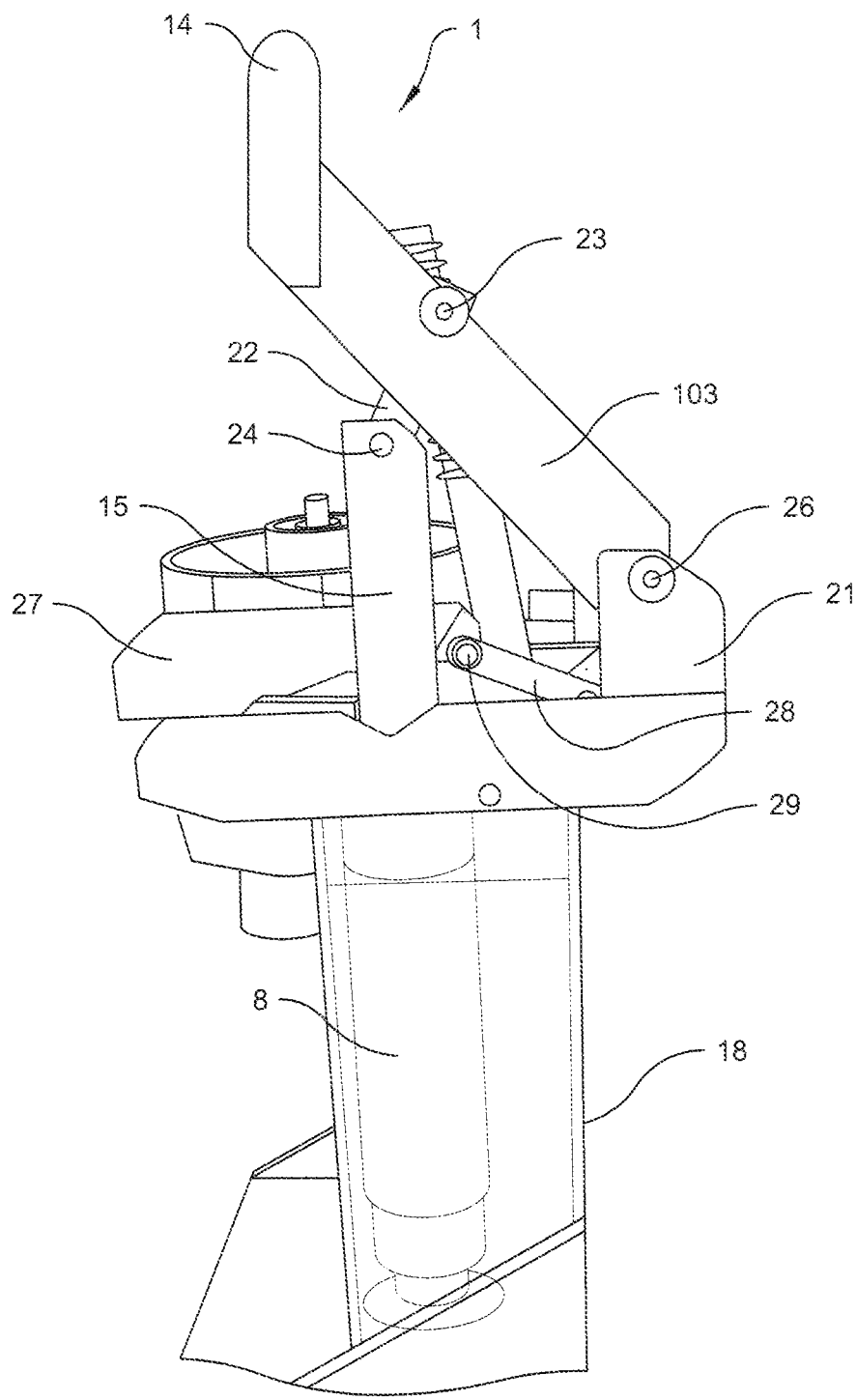
FIG. 4 is a right side view illustrating elements along the interior and exterior of a powder dispensing apparatus including a rotatable handle, rotatable carriage, pump, funnel, and reservoir in accordance with an embodiment of the apparatus.

Referring now to FIGS. 2-4, the powder dispensing apparatus 1 is shown without the exterior portion of the housing 11 forming the dispenser 4. The interior of the housing 11 includes a generally planar support element 16 disposed in a cantilever arrangement above a reservoir 18. The reservoir 18 could be a container-like structure mechanically fastened or adhesively bonded to one side of the support element 16. The structure comprising the reservoir 18 could be composed of one or more materials which form a thermal short circuit thereby insulating the contents within the reservoir 18 from the surrounding environment. In some embodiments, the reservoir 18 could reside as a separate element insertable into or onto the tower 3 or base 2. In yet other embodiments, the reservoir 18 could form the tower 3, as represented in FIGS. 2-4. In the latter embodiments, the base 2 could be directly attached and fixed to the reservoir 18, as represented in FIG. 3.

In some embodiments, a fill tube 17 could communicate with the reservoir 18 via the dispenser 4 enabling refill of the reservoir 18 as required. The fill tube 17 could be accessible after removal of the cover 7. In yet other embodiments, the reservoir 18 could be accessible via a removable or rotatable cover or cover with grate-like openings that allow a user to refill the reservoir 18.

A pump 8 and a funnel 5 are likewise disposed along the same side of the support element 16 with respect to the reservoir 18. The pump 8 is attached and fixed to the support element 16 in a substantially perpendicular arrangement. The pump 8 is positioned along the support element 16 so as to extend into and communicate with the reservoir 18. The funnel 5 is also attached to the support element 16 in a substantially perpendicular arrangement residing immediately adjacent to and along the exterior of the reservoir 18.

Figure 5A:
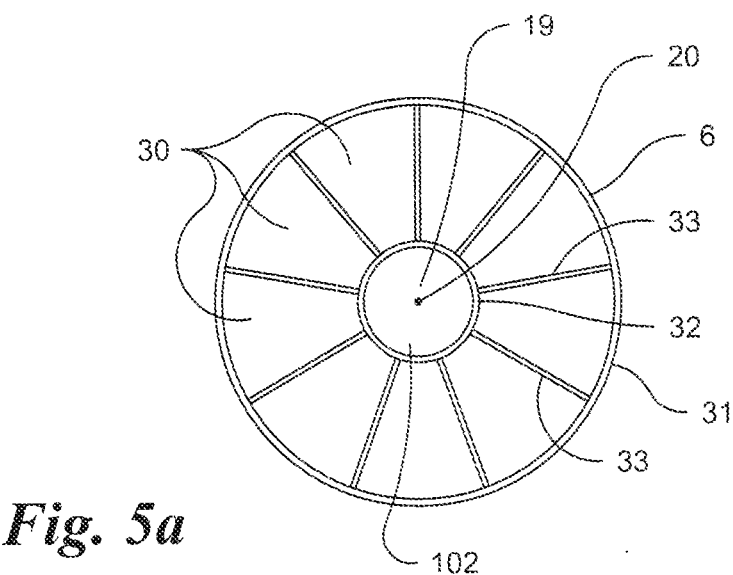
FIG. 5a is a top view illustrating compartments within a substantially circular and rotatable carriage in accordance with an embodiment of the apparatus.

A rotatable carriage 6 contacts the support element 16 along the side opposite from the reservoir 18, funnel 5, and pump 8. The rotatable carriage 6 is a generally circular element could include a plurality of generally wedge-shaped compartments 30 disposed about a central opening 102, as illustrated in FIG. 5a. The size of the compartments 30 could have the same or different. In preferred embodiments, the compartments 30 are similarly sized and capable of holding a specified quantity of powder 46.

The rotatable carriage 6 is assembled onto a spindle 19 which extends from the support element 16 in a perpendicular arrangement. The spindle 19 could be directly molded onto the support element 16. This arrangement allows the spindle 19 to extend up and through the central opening 102. The central opening 102 is preferred to be dimensioned so as to allow at least a clearance fit with the spindle 19 so that the rotatable carriage 6 freely rotates with respect to the spindle 19 about a central axis 20 extending through the center of the spindle 19 perpendicular to the support element 16. The rotatable carriage 6 is positioned along the support element 16 so that at least one compartment 30 along the rotatable carriage 6 is disposed above the funnel 5.

The support element 16 could include a pair of flanges 21 disposed along one end thereof and extending upward in a perpendicular arrangement. The pairwise arrangement of arms 103 along a generally u-shaped handle 14 are each separately and loosely attached to a flange 21 via a fastener 25 or 26, so as to allow the handle 14 to rotate freely with respect to the flanges 21.

The pump 8 could include a piston 15 which is extendable from and retractable into the pump 8. The upper end of the piston 15 could be tube shaped. A linkage 22 could be loosely attached at one end to the end of the piston 15 via a fastener 24 and at a second end to one arm 103 of the handle 14 via another fastener 23. This arrangement allows the linkage 22 to freely rotate as the handle 14 is rotated about the flanges 21 causing the piston 15 to move upward and downward with respect to the vertically disposed pump 8.

Figure 6:
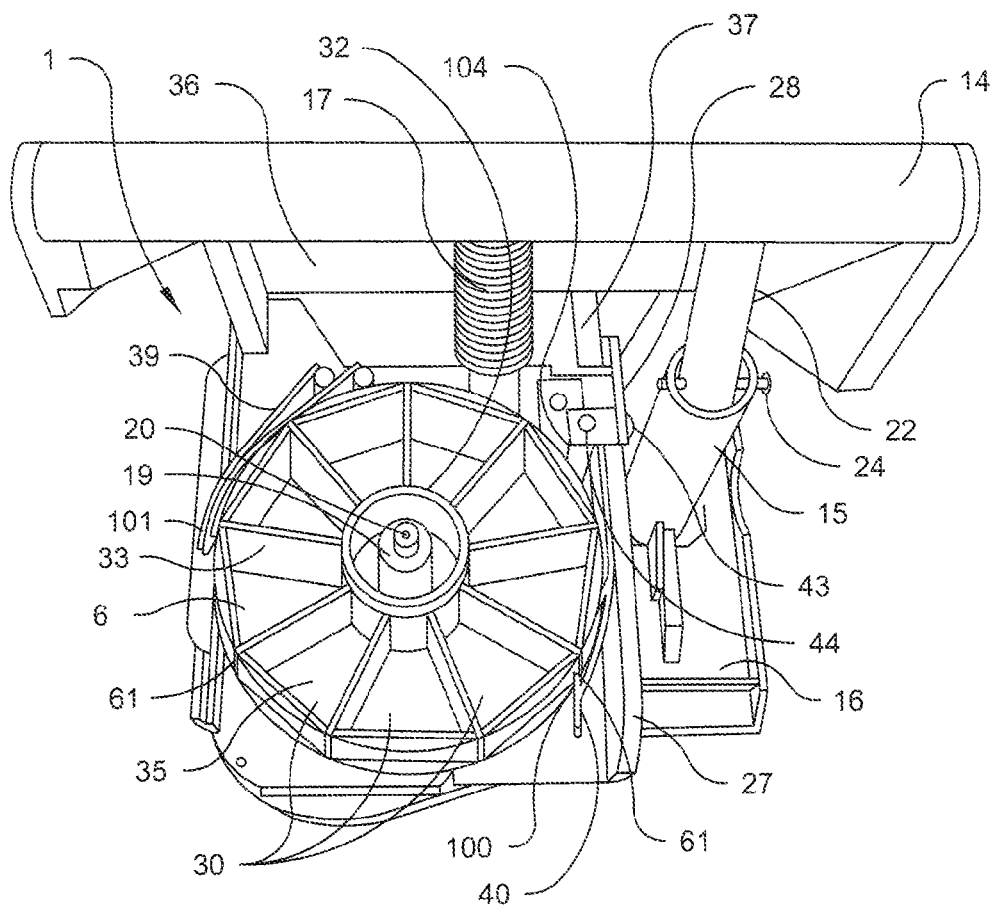
FIG. 6 is a top elevated view illustrating arrangement of rotatable carriage and pump within a powder dispensing apparatus with respect to a rotatable handle in accordance with an embodiment of the apparatus.
Figure 7:
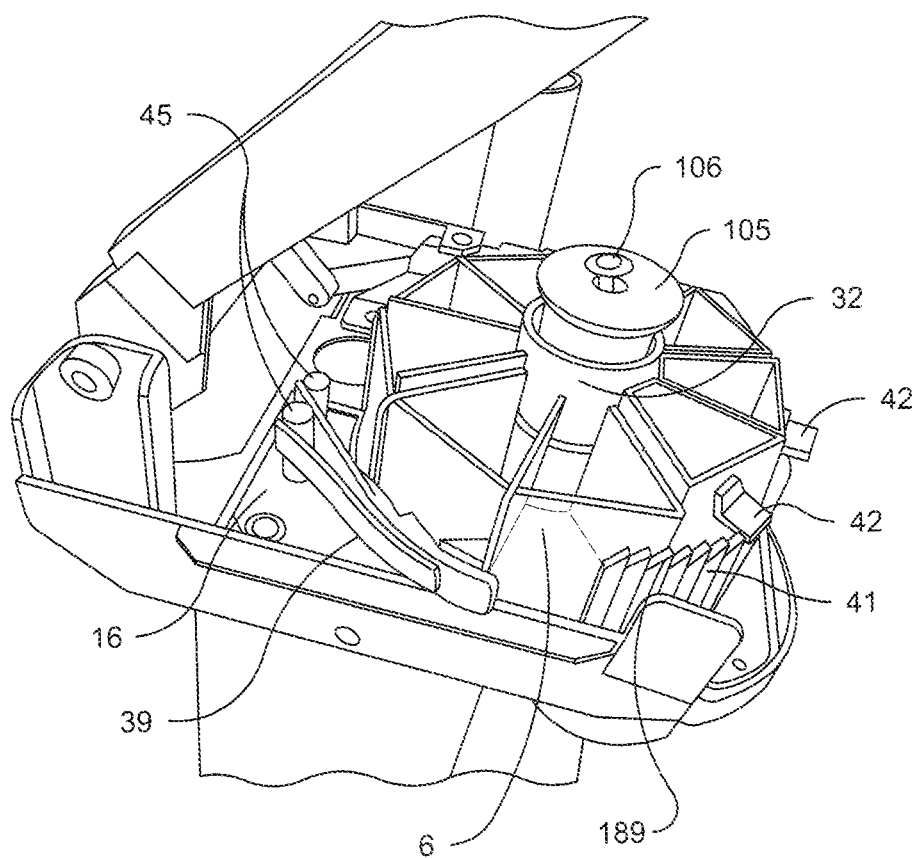
FIG. 7 is a left side elevated view illustrating arrangement of rotatable carriage and pump within a powder dispensing apparatus with respect to a rotatable handle in accordance with an embodiment of the apparatus.
Figure 8:
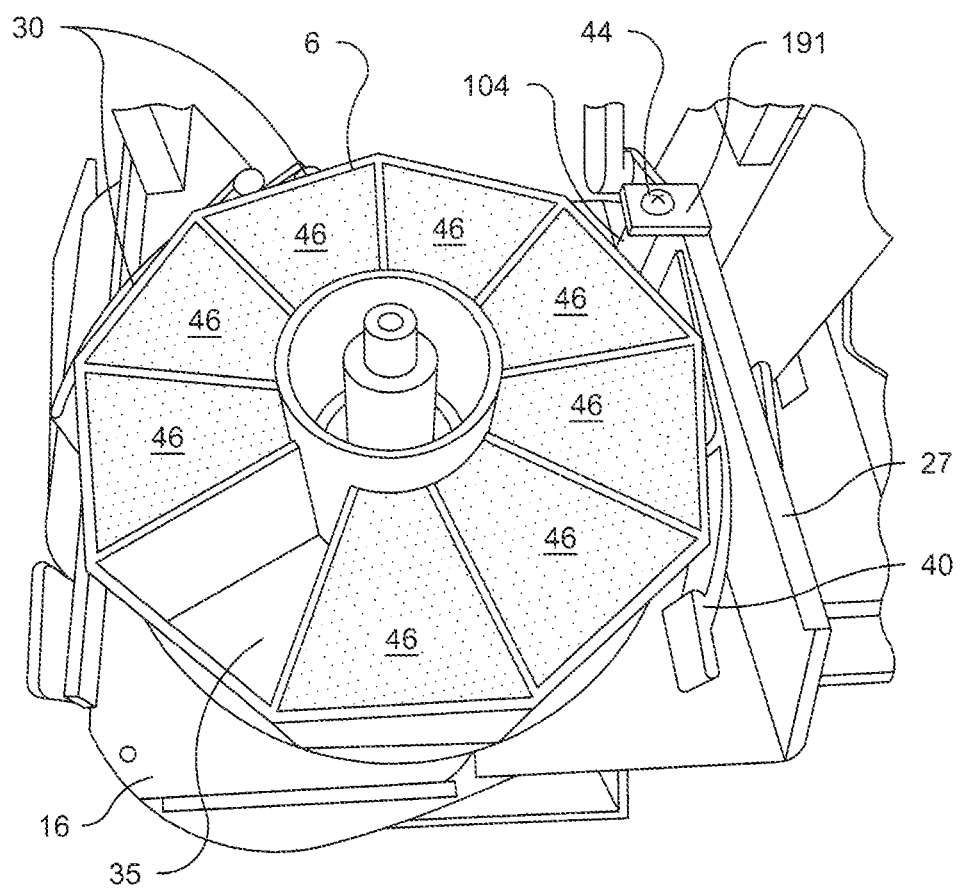
FIG. 8 is a top elevated view illustrating rotatable carriage with powder disposed in several compartments adjacent to an opening communicating with a funnel in accordance with an embodiment of the apparatus.

Referring now to FIG. 5a, the rotatable carriage 6 is shown with a plurality of compartments 30 formed by an outer circumferential wall 31 and an inner circumferential wall 32 attached via a plurality of side radial walls 33 disposed in a spoke-like arrangement. In this embodiment, the rotatable carriage 6 is a single unitary element with open compartments 30. In other embodiments, the outer circumferential wall 31 could be a multi-sided element composed of a plurality of planar elements, as represented in FIG. 6. The rotatable carriage 6 could be molded or form a single unit via techniques understood in the art or be assembled from separate components mechanically fastened, adhesively bonded, or ultrasonically welded together to form the desired shaped. Rubber gaskets could be removably attached or co-molded to the top and bottom surfaces of the side radial walls 33 or compartments 30 to minimize or prevent powder leakage.

Figure 5B:
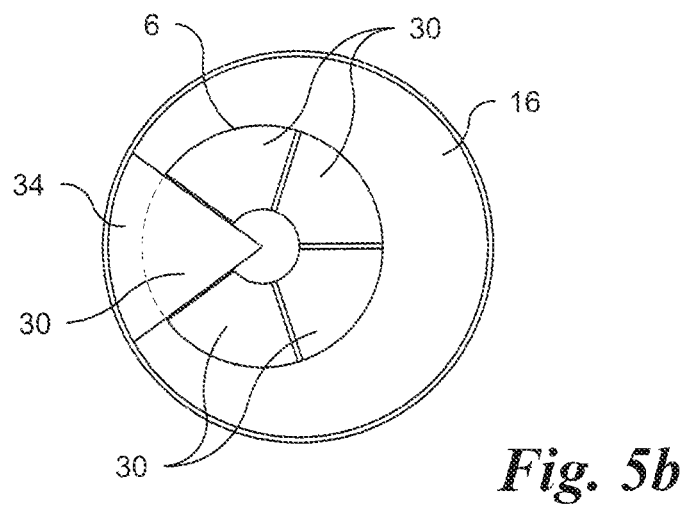
FIG. 5b is a top view illustrating cover which prevents powder from entering a compartment in accordance with an embodiment of the apparatus.

Referring now to FIG. 5b, the rotatable carriage 6 is shown residing along and above a support element 16. The housing 11 could include a wedge-shaped cover 34 attached and fixed to the housing 11 which contacts the rotatable carriage 6 parallel to and opposite of the support element 16. The cover 34 is dimensioned so as to completely cover at least one compartment 30. This arrangement allows powder to communicate with at least less than all compartments 30 as further described herein.

Referring now to FIGS. 4 and 6-8, the rotatable carriage 6 is disposed and rotatable about a spindle 19. The rotatable carriage 6 is attached to the spindle 19 via a cap 105 which contacts the inner circumferential wall 32 and is secured to the spindle 19 via a fastener 106. The rotatable carriage 6 is positioned along the support element 16 so that at least one compartment 30 is aligned with an opening 35 disposed along and through the support element 16. The opening 35 could include a variety of shapes, preferably a shape that closely approximates the cavity within the compartment 30.

The outer circumferential wall 31 of the rotatable carriage 6 includes a plurality of index tabs 42 attached thereto via adhesive or mechanical fasteners. One index tab 42 is attached immediately adjacent to the each compartment 30 so as to extend radially outward therefrom. The support element 16 further includes an index flange 41 attached thereto and oriented in a perpendicular arrangement. The index flange 41 includes triangular-shaped teeth 189 positioned at a height above the support element 16 allowing interaction between the index tab 42 along one compartment 30 and the teeth 189. The teeth 189 are biased so as to allow the index tab 42 to move along the teeth 189 in the rotational direction of the rotatable carriage 6. The index tab 42 along one compartment 30 is seated along one of the teeth 189 when the rotatable carriage 6 stops rotating so as to align the respective compartment 30 with the opening 35. This arrangement allows the powder 46 residing within the compartment 30 aligned with the opening 35 to drop into the funnel 5, as further illustrated in FIGS. 8 and 9.

The rotatable carriage 6 is also indexed to align with the opening 35 via an index arm 39 attached at one end to the support element 16 via a pair of pins 45 fixed and attached to the support element 16 via an adhesive or fasteners. This arrangement biases the index arm 39 toward the rotatable carriage 6 in a spring-like fashion. A second end along the index arm 39 could further include a barb 101 which engages the vertical edge 61 extending from the side radial wall 33 between two adjacent compartments 30. The vertical edges 61 could be formed by either extending the side radial walls 33 beyond the radius of the outer circumferential wall 31 or molding or attaching a thin polymer strip to the outer circumferential wall 31 opposite of each side radial wall 33. When the rotatable carriage 6 first begins to rotate, the index arm 39 is pushed outward by the rotatable carriage so as to allow the barb 101 to slide over the vertical edge 61. The index arm 39 continues to ride along the outer circumferential wall 31 thereby allowing the barb 101 to engage the vertical edge 61 immediately adjacent to the next paired arrangement of compartments 30.

In some embodiments, the rotatable carriage 6 is manually operable via the handle 14. The handle 14 could include a flange 36 disposed between the pairwise arrangement of flanges 21. The flange 36 could further include an arm 37 which extends substantially downward therefrom. One end of a linkage 28 could be loosely mechanically attached via a fastener 43 to the arm 37 opposite of the flange 36. A second end of the linkage 28 could be loosely mechanically attached via a fastener 29 to one end of an arm 40 positioned along and parallel to the support element 16. The arm 40 is further positioned between the rotatable carriage 6 and a flange 27, the latter extending from and perpendicular to the support element 16. The arm 40 is further loosely constrained in the vertical direction by a flange 191 fixedly attached via a fastener 44 to a spacer 104 perpendicularly extending from the support element 16. The described arrangement allows the arm 40 to freely move forwards and backwards parallel to the support element 16 between the rotatable carriage 6 and flange 27. The arm 40 is slightly curved toward the rotatable carriage 6 and includes a barb 100 at the end opposite attachment to the linkage 28. The curvature of the arm 40 biases the barb 100 against the outer circumferential wall 31. When the handle 14 is fully rotated upward, the arm 40 slides forward so as to allow the barb 100 to engage a vertical edge 61. When the handle is fully rotated downward, the arm 40 slides backward thereby pulling on the vertical edge 61 and rotating the rotatable carriage 6 so as to advance the next compartment 30 into alignment with the opening 35. The arm 40, linkage 28, and arm 37 should be sufficiently long so as to ensure the desired functionality.

In other embodiments, the rotatable carriage 6 could translate rather than rotate with respect to the hopper 60. The carriage 6 could be disposed in a slidable fashion within a channel or other structure thus allowing the carriage 6 to translate parallel to and below the hopper 60. The carriage 6 could include a compartment 30 having side walls arranged so that the top and bottom are open.

In a first position, the carriage 6 could align with the opening 35 along the hopper 60 so as to allow powder 46 to fall into the compartment 30, as otherwise described herein. In a second position, the compartment 30 could align with either a funnel 5 or a container 63 disposed below the channel. The channel could include a second opening allowing the powder 46 to fall from the compartment 30 when oriented in the second position.

A flange could be attached adjacent to the top of the compartment 30 and extend perpendicular with respect to one side. The flange could contact and slide along a lower surface of the hopper 60. The flange could align with the opening 35 in the second position so as to prevent powder 46 from further entering the carriage 6.

An arm could extend perpendicular with respect to one side wall and extend through a channel wall in a slidable arrangement. The carriage 6 is operable via the arm. The arm and hopper 60 could be manually operable via a handle 14 or mechanically operable via a motor 168, as otherwise described herein with adaptations for linear actuation.

Referring now to FIG. 9, the dispenser 4 is shown including a hopper 60 disposed above and communicating with at least one compartment 30 within the rotatable carriage 6. The hopper 60 is a container-like structure adapted to hold a powder 46. The hopper 60 could include a cover 7. In some embodiments, it might be advantageous for the hopper 60 to communicate with more than one compartment, as represented in FIG. 5b. The walls 107 of the hopper 60 could be sloped or otherwise shaped to further ensure powder 46 slides down into the compartments 30. It is preferred for the hopper 60 to not communicate with the compartment 30 immediately above the opening 35 so as to avoid uncontrolled flow of powder 46 from the hopper 60 into the container 63. In other embodiments, a motor 62 coupled to one or more motor-driven elements within the powder dispensing apparatus 1 could be secured adjacent to the hopper 60. In yet other embodiments, the rotatable carriage 6, cover 7, and/or hopper 60 could be attached to the powder dispensing apparatus 1 in a removable fashion to facilitate cleaning.

Figure 10A:
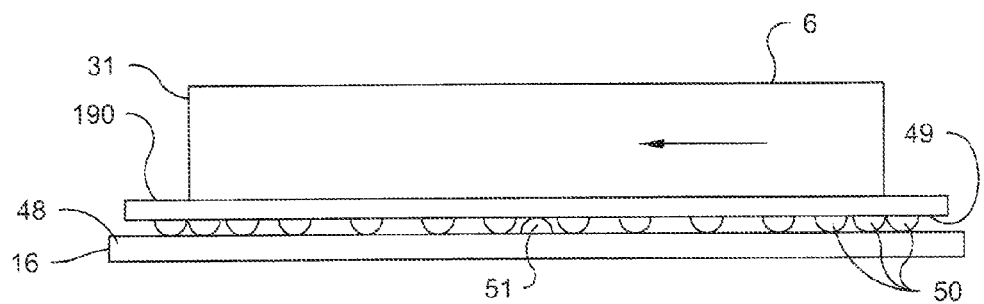
FIG. 10a is a side view illustrating a plurality of first nubs disposed along a bottom surface of a rotatable carriage and a second nub disposed along the top surface of a planar element within a dispenser in accordance with an embodiment of the apparatus.
Figure 10B:
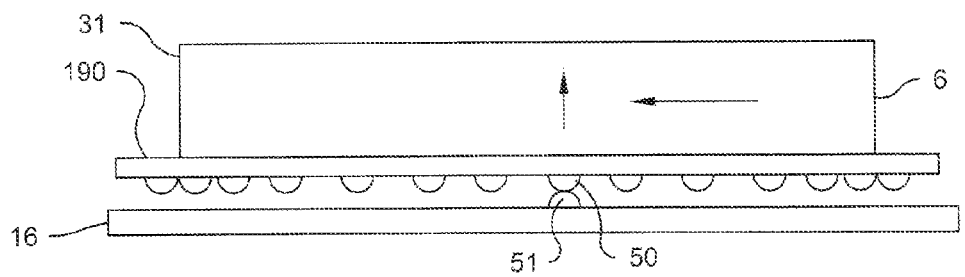
Figure 10C:
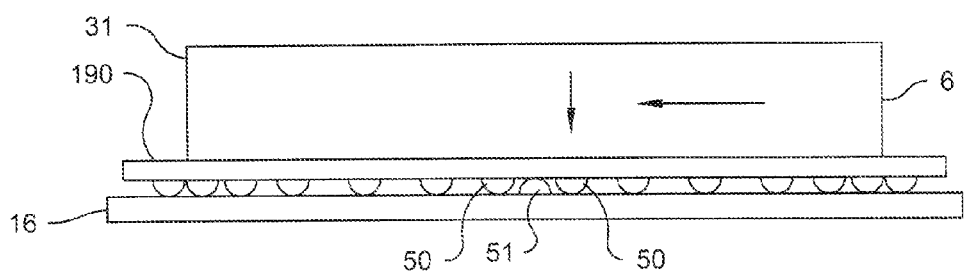
FIG. 10c is a side view showing relative position between rotatable carriage and support element after interaction between first and second nubs as further illustrated in FIGS. 10a and 10b.

Referring now to FIGS. 10a-10c, the rotatable carriage 6 is shown disposed above the support element 16. The outer circumferential wall 31 as otherwise described in FIG. 5a could further include a ring 190 either molded or adhesively or mechanically attached thereto so as to be disposed between the rotatable carriage 6 and the support element 16. The ring 190 could include a plurality of first nubs 50 projecting downward from a lower surface 49. The first nubs 50 could be either molded onto or adhesively bonded to the lower surface 49. The upper surface 48 of the support element 16 could also include at least one second nub 51 adhesively bonded to or molded onto thereto. The first and second nubs 50, 51 could be substantially curvaceous as represent in FIGS. 10a-10c or any other shape which allows sliding motion between rotatable carriage 6 and support element 16. In alternate embodiments, the first nubs 50 could reside directly along the lower edge of the outer circumferential wall 31.

The height of the first and second nubs 50, 51 are preferred to be complementary spaced so as to allow the first nubs 50 to contact the upper surface 48 when the second nub(s) 51 contact the lower surface 49, as represented in FIGS. 10a and 10c; however, the height of first and second nubs 50, 51 could differ in some applications. As the rotatable carriage 6 rotates, the first nubs 50 slide up and over the second nub 51 as represented in FIGS. 10b and 10c, respectively. This repeated interaction causes the rotatable carriage 6 to move up and down thereby shaking the rotatable carriage 6 and its contents. When a compartment 30 is aligned over an opening 35, the shaking motion, in part or whole, causes the powder 46 to fall into the container 63, as represented in FIG. 9. This feature is particularly beneficial when the powder 46 is prone to clumping or agglomerations.

Figure 11A:
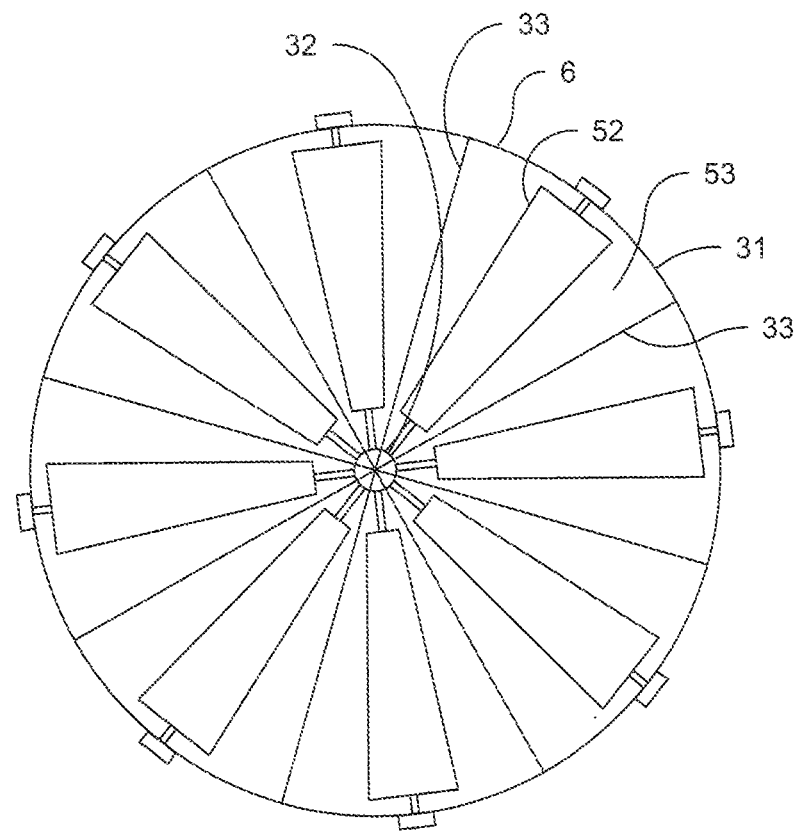
FIG. 11a is a top view illustrating rotatable carriage with a plurality of compartments each including a rotatable paddle in the CLOSED position which rotates to release powder therefrom in accordance with an embodiment of the apparatus.
Figure 11B:
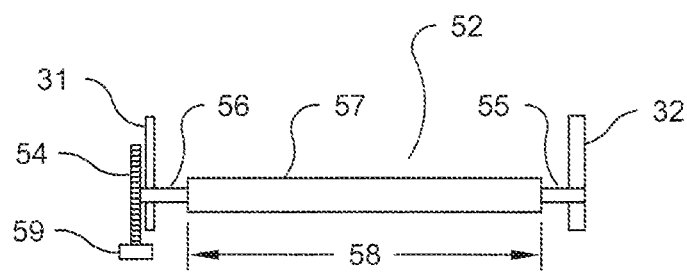

Referring now to FIGS. 11a and 11b, the rotatable carriage 6 could also include a plurality of compartments 30 disposed between an outer circumferential wall 31, an inner circumferential wall 32, and a pairwise arrangement of radial side walls 33. Each compartment 30 could further include a horizontal wall 53, substantially parallel to the support element 16, attached either mechanically or adhesively to the four perimeter walls 31, 32, and 33 forming a cup-like structure closed at the bottom or lower end. In this embodiment, the horizontal wall 53 has an opening 58 facilitating dispensing of powder 46 from the compartment 30. A rotatable paddle 52 is further attached to the rotatable carriage 6 within each compartment 30. The rotatable paddle 52 includes a plate 57 complementary shaped and disposed within the opening 58 to prevent dispensing of the powder 46. The plate 57 is further attached to a pair of shafts 55, 56 disposed along opposing ends of the plate 57 and along a common axis that allows the plate 57 to freely rotate. One shaft 55 passes through a complementary sized hole through the inner circumferential wall 32. The other shaft 56 passes through a complementary sized hole through the outer circumferential wall 31. Holes are preferred to be dimensioned with at least a clearance fit so that the shafts 55, 56 freely rotate therein. A gear 54 is attached and fixed to the end of the shaft 56 along the exterior of the outer circumferential wall 31 so that gear 54, shafts 55, 56, and plate 57 rotate as a single unit.

Figure 12A:
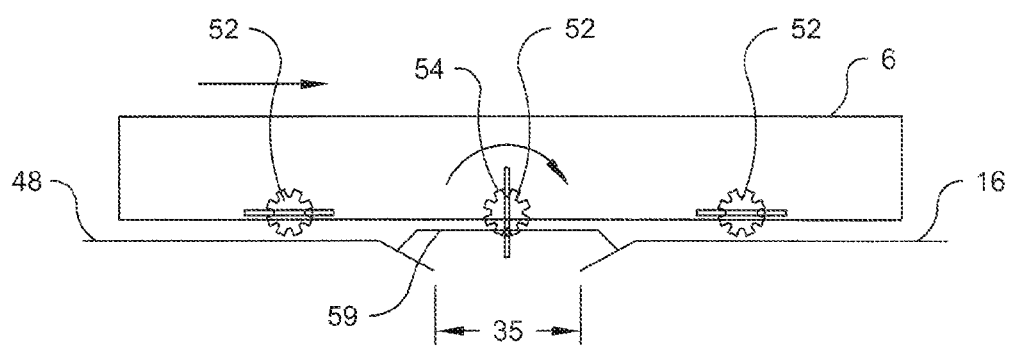
FIG. 12a is a schematic diagram illustrating interaction between a gear disposed at one end of a rotatable paddle and an actuation bracket attached to the support element of a dispenser adjacent to an opening which causes the gear to rotate the rotatable paddle in accordance with an embodiment of the apparatus.
Figure 12B:
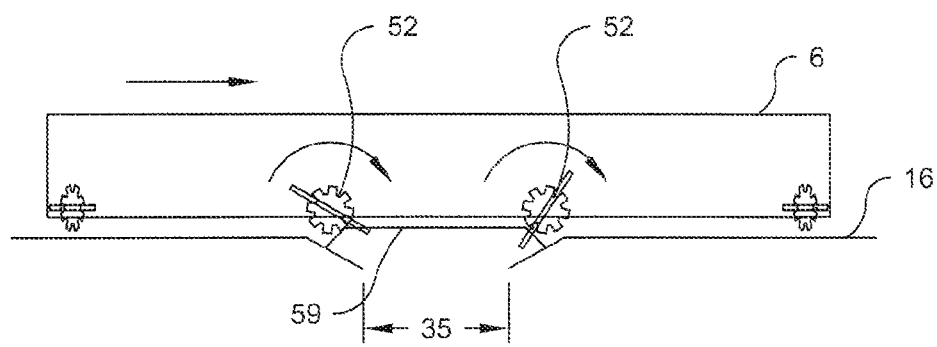

Referring now to FIGS. 11b, 12a, and 12b, the upper surface 48 of the support element 16 could include an actuation bracket 59 extending above the upper surface 48 immediately adjacent to the opening 35. The actuation bracket 59 could be mechanically attached or adhesively bonded to the support element 16. In some embodiments, the actuation bracket 59 and/or gears 54 could be composed of a rubber or other material that grabs or sticks when contacted. In other embodiments, the actuation bracket 59 and gear 54 could be textured or include complementary teeth-like structures.

The gears 54 are dimensioned and position along the rotatable carriage 6 so as to provide a gap between the gears 54 and upper surface 48, as represented in FIG. 12a. The actuation bracket 59 extends above the support element 16 so as to allow contact with a gear 54 immediately adjacent to the opening 35 as the rotatable carriage 6 rotates. When the gear 54 contacts the actuation bracket 59, the gear 54 rotates thus rotating the plate 57 within the opening 58 to an OPEN position so as to allow the powder 46 therein to fall from the compartment 30 into the funnel 5. Rotation of the plate 57 further enhances dispensing functionality by interacting with and agitating the powder 46. At the end of the actuation bracket 59, the gear 54 is rotationally positioned so that the plate 57 is in the CLOSED position, thus closing the opening 58. This functionality allows the otherwise empty compartment 30 to be refilled with powder 46. In other embodiments, the actuation bracket 59 could be positioned so as to contact and forcibly rotate the rotatable paddle 52 regardless of the composition, texturing, and other features of the gears 54 and actuation bracket 59.

Figure 13:
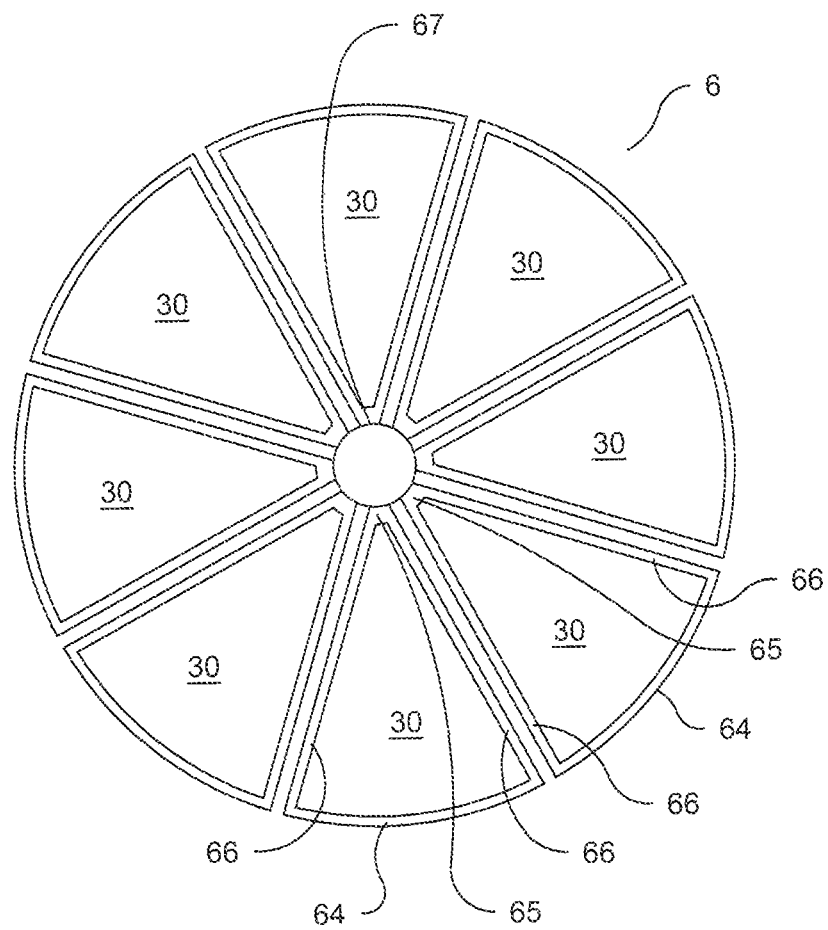
FIG. 13 is a top view illustrating a plurality of separate compartments attached to a center ring which allows each compartment to move independently from the remaining compartments in accordance with an embodiment of the apparatus.

Referring now to FIG. 13, the rotatable carriage 6 is shown composed of a plurality of separate and independent compartments 30. Each compartment 30 includes an outer wall 64, inner wall 65, and a pair of side radial walls 66 molded or otherwise formed into a single, substantially wedge-shaped body. The outer and inner walls 64, 65 could be arcuous so as to form a substantially circular-shaped structure or planar to form a polygonal-shaped structure. A plurality of compartments 30 is arranged about a circular-shaped live hinge 67 so that the inner wall 65 of each compartment 30 contacts the outer circumference of the live hinge 67. The live hinge 67 could be composed of a rubber or other pliable and resilient material which readily deflects under a load, yet recovers its original shape when a load is removed. Each inner wall 65 is separately and either mechanically fixed or adhesively bonded to the outer circumference of the live hinge 67 forming a pie-shaped structure.

Figure 14:
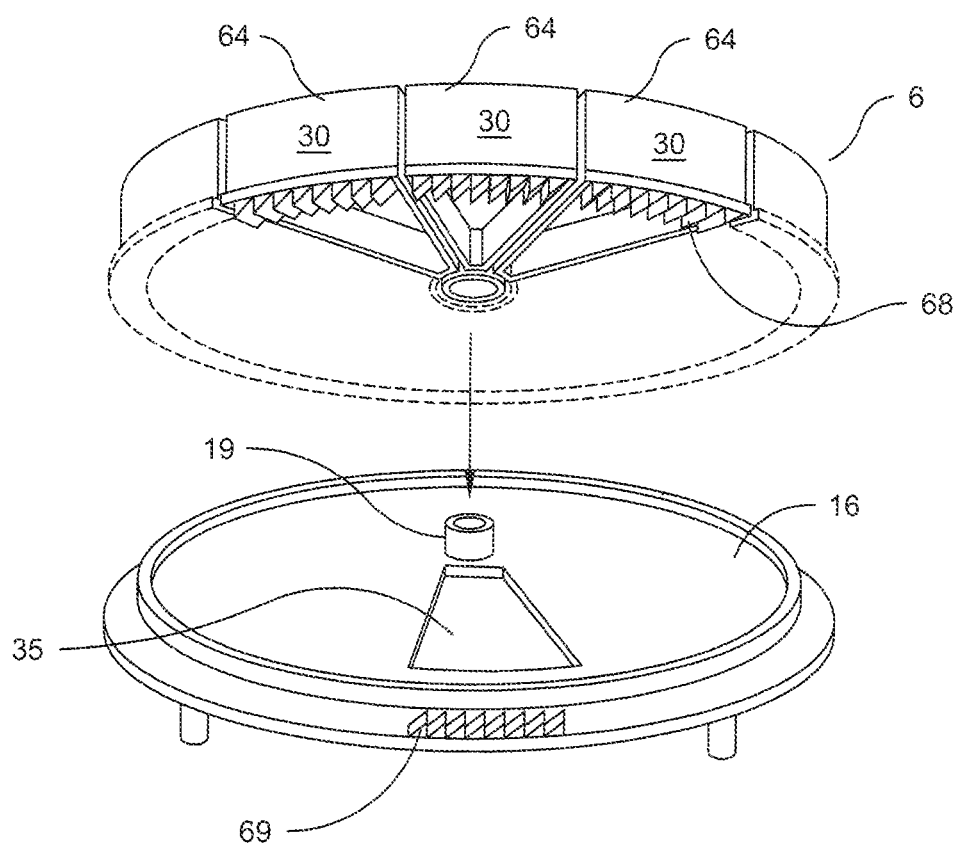
FIG. 14 is a side exploded view illustrating arrangement of first and second nubs which cause each compartment to separately deflect upward and downward multiple times when aligned over an opening to ensure release of powder from a compartment in accordance with an embodiment of the apparatus.

Referring now to FIG. 14, a lower edge of the outer wall 64 along each compartment 30 could include a plurality of first nubs 68 disposed in a generally downward arrangement. The support element 16 could also include a plurality of second nubs 69 disposed upward and along a radial position immediately adjacent to the opening 35. Both first nubs 68 and second nubs 69 are positioned so as to overlay in a complementary arrangement when the rotatable carriage 6 is seated onto the spindle 19 along the support element 16.

Figure 15A:
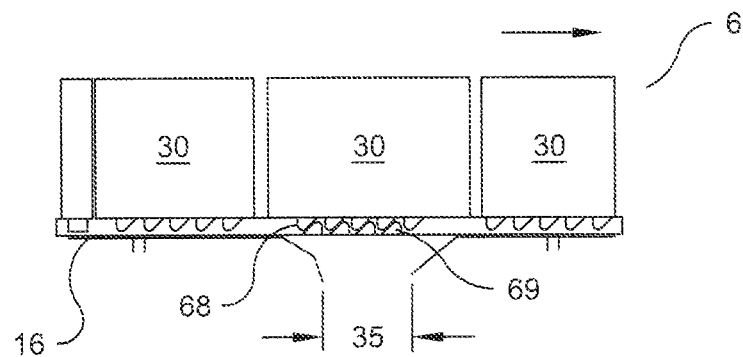
FIG. 15a is a schematic view illustrating the side of a compartment aligned with an opening when the first and second nubs are complementary aligned in accordance with an optional embodiment of the apparatus.
Figure 15B:
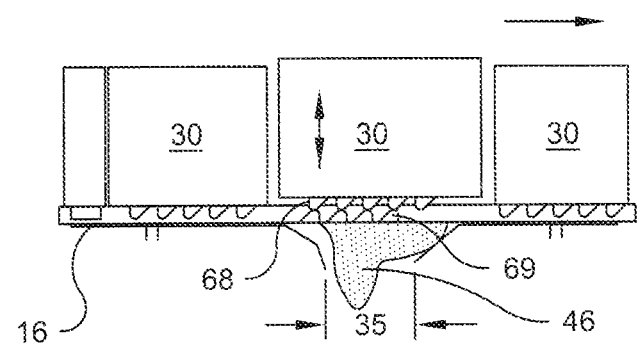
FIG. 15b is a schematic view illustrating the side of a compartment as further illustrated in FIG. 15a when the first and second nubs are aligned to raise the compartment above the support element whereby the successive up and down motion of the compartment causes the powder therein to fall from the compartment.

Referring now to FIGS. 15a and 15b, the first and second nubs 68, 69 interact when the rotatable carriage 6 rotates causing the compartment 30 attached to the first nubs 68 to repeatedly lift up and down relative to the support element 16. The up and down motion of a compartment 30 is facilitated by deflection of the live hinge 67. The compartments 30 adjacent to the immediate compartment 30 are isolated from this motion by virtue of the deflection and damping properties of the live hinge 67. The resultant shaking or vibrating motion agitates the powder 46 ensuring release from the compartment 30 immediately aligned with an opening 35, as further represented in FIG. 15b.

Referring now to FIGS. 16a-16d, the funnel 5 includes a cup-shaped section 70 having wall 108 that is at least partially sloped downward toward an opening 71. In some embodiments, the funnel 5 could also include a handle 73 disposed along one end. In other embodiments, at least two ports 74 could be positioned along the wall 108 with at least one port 74 positioned within the sloped region 109. The ports 74 enable injection of a liquid 82 from a reservoir 18 via a pump 8 as otherwise described herein and further illustrated in FIG. 18b. Each port 74 aligns with a connector port 75 disposed along the tower 3, dispenser 4, or reservoir 18, thus allowing for the uninterrupted flow of liquid 82 from the pump 8 into the funnel 5. In some embodiments, the funnel 5 functions to direct only powder 46 from a compartment 30 into a container 63. In other embodiments, the funnel 5 enables mixing of a powder 46 and liquid 82 dispensed into the funnel 5 prior to directing the mixture into a container 63. In latter embodiments, the ports 74 inject a liquid 82 into the funnel 5 causing the liquid 82 to swirl along the interior of the cup-shaped section 70 in a downward-directed spiraling fashion toward the opening 71. This swirling action also facilitates cleaning within the cup-shaped section 70 after proper mixing of the powder 46 and liquid 82.

In other embodiments, the wall 108 and sloped region 109 are generally arranged as represented in FIG. 2 to allow the ports 74 to produce a downward tumbling vortex with the liquid 82. The vortex is sustained by the pressure exerted by the ports 74 to ensure proper mixing between powder 46 and liquid 82 within the funnel 5.

Figure 16A:
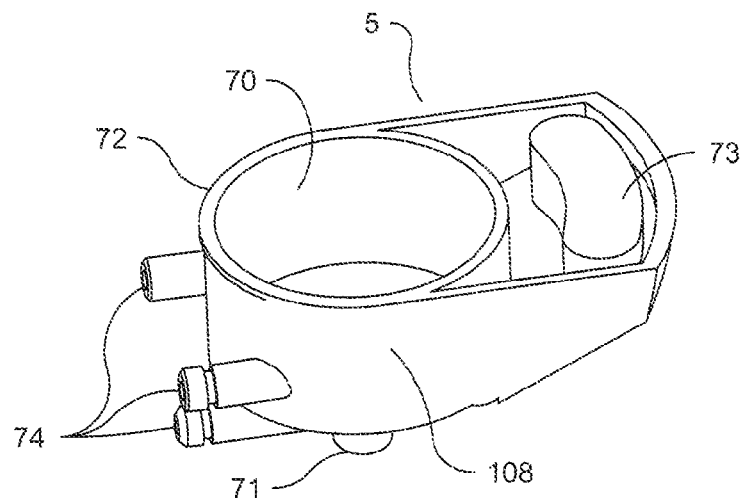
FIG. 16a is a side perspective view illustrating funnel with cup-shaped section with opening, handle, flange, and plurality of ports which allow liquid to be injected into the cup-shaped section in accordance with an embodiment of the apparatus.
Figure 16B:
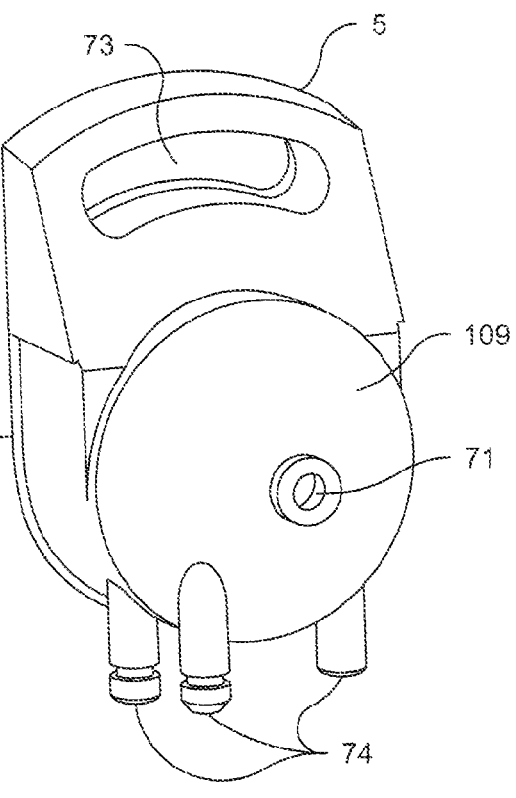
Figure 16C:
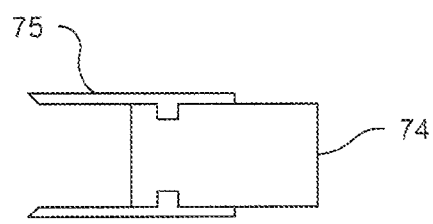
FIG. 16c is an enlarged partial section view illustrating attachment of a port along the funnel with a connector port disposed along the dispenser or tower in accordance with an embodiment of the apparatus.
Figure 16D:
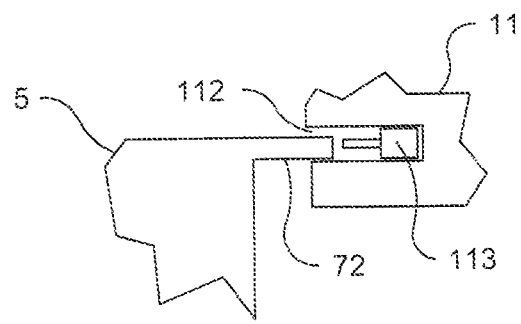
FIG. 16d is an enlarged partial section view illustrating attachment of funnel to housing via a flange and channel arrangement in accordance with an embodiment of the apparatus.
Figure 16E:
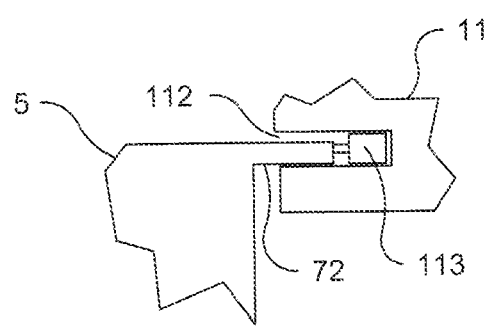
FIG. 16e is an enlarged partial section view illustrating interaction between flange and sensor disposed within the channel as further shown in FIG. 16d.

In yet other embodiments, the funnel 5 could include a flange 72 disposed along a port of the upper edge of the cup-shaped section 70, as shown in FIG. 16a. The flange 72 could facilitate attachment of the funnel 5 to the dispenser 4. For example, the flange 72 in some embodiments could contact a channel 112 disposed along the housing 11, as shown in FIG. 16d, which enables a user to properly attach the funnel 5 to the powder dispensing apparatus 1. The channel 112 could also include a sensor 113 in other embodiments contacted by the flange 72, as illustrated in FIG. 16e. For example, the sensor 113 could be a depression-type switch or the like which indicates the funnel 5 is properly seated onto the housing 11 when the switch is depressed.

Figure 17A:
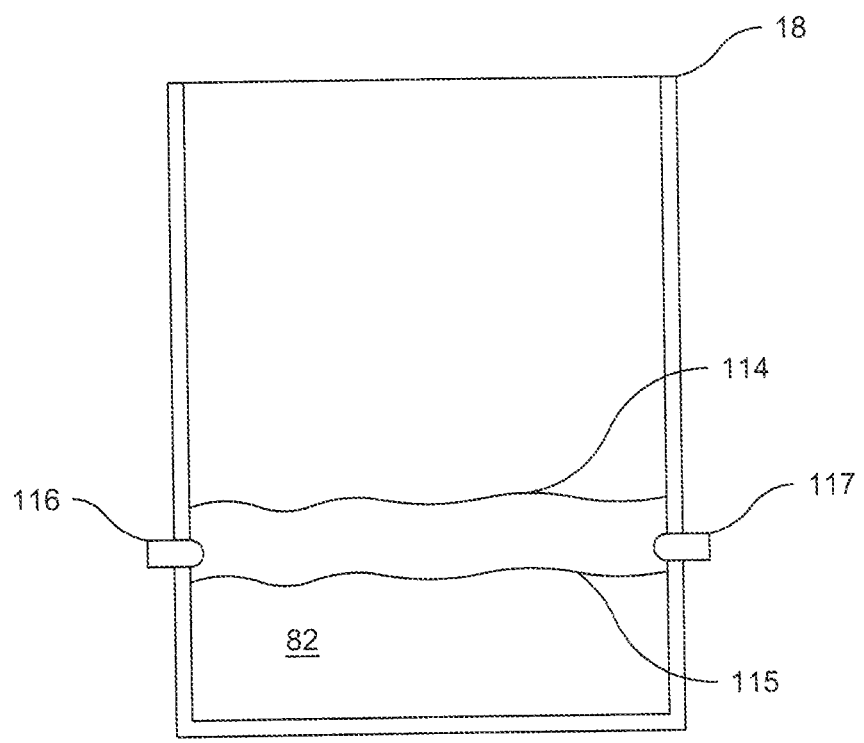
FIG. 17a is a section view illustrating reservoir with optional sensors in accordance with an embodiment of the apparatus.

Referring now to FIG. 17a, the reservoir 18 is shown with a first probe 116 and a second probe 117 disposed along and attached to opposing sides of the reservoir 18. It is likewise possible for the first and second probes 116, 117 to be disposed along and attached to one side or to two immediately adjacent sides. The first and second probes 116, 117 extend into the reservoir 18 so as to communicate with a liquid 82 therein. The interface between each probe 116, 117 and the reservoir 18 could be sealed with a waterproof adhesive or caulk or gasket to prevent leakage. In preferred embodiments, the first and second probes 116, 117 are disposed at the same height within the reservoir 18. Both probes 116, 117 are electrically connected to a continuity circuit and thereafter electrically communicate with a control circuit. The liquid 82 contacts the first and second probes 116, 117 when the liquid 82 is at a first level 114, thus completing the continuity circuit. The first level 114 could indicate sufficient liquid 82 within the reservoir 18 for operation of a pump 8. The liquid 82 would otherwise not contact one or both probes 116, 117 when the liquid 82 is at a second level 115. The second level 115 could indicate that either the reservoir 18 is empty or does not hold the minimum quantity of liquid 82 required to prevent damage to the pump 8 during its operation. In preferred embodiments, the first level 114 is the minimum height of liquid 82 within the reservoir 18 required to contact both probes 116, 117 and the second level 115 is the minimum height at which the liquid 82 only contacts the first probe 116 or second probe 117.

Figure 17B:
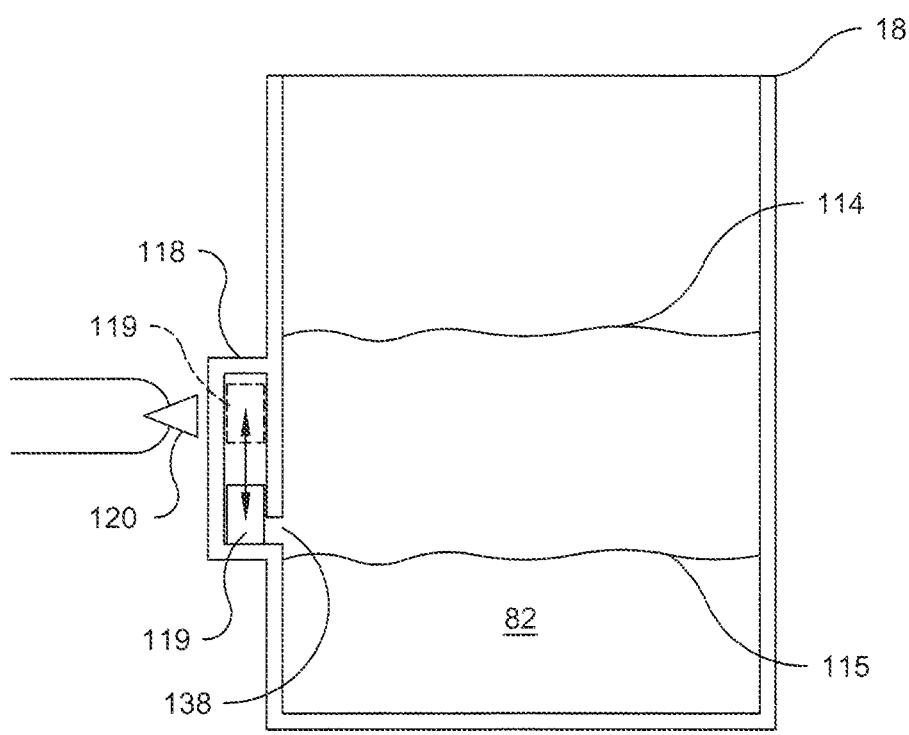
FIG. 17b is a section view illustrating reservoir with optional float sensor in accordance with an embodiment of the apparatus.

Referring now to FIG. 17b, the reservoir 18 is shown including a float 119 disposed within a housing 118. The float 119 could be composed of a material with a density less than that of the liquid 82. The housing 118 could be either molded or attached to the reservoir mechanically or via an adhesive. In preferred embodiments, the housing 118 includes a vertically disposed column or channel, as represented in FIG. 17b. The lower end of the housing 118 communicates with the reservoir 18 via an opening 138 so as to allow liquid 82 within the reservoir 18 to enter and exit the housing 118. The float 119 freely moves up and down within the housing 118 to a level corresponding to the overall level of liquid 82 within the reservoir 18. When the float 119 is positioned at or near the top of the housing 118, the float 119 interacts with a switch 120 mounted to the housing 118 or contacting the housing 118. When the liquid 82 is at a first level 114, the float 119 moves upward within the housing 118 so as to contact the switch 120. Activation of the switch 120 by the float 119 could indicate sufficient liquid 82 within the reservoir 18 for operation of a pump 8. When the liquid 82 is at a second level 115, the float 119 no longer interacts with the switch 120 thus indicating that the reservoir 18 either is empty or does not hold the minimum quantity of liquid 82 required to prevent damage to the pump 8. The switching mechanism between float 119 and switch 120 could include, but is not limited to, a magnet within the float 119 and reed switch disposed along the housing 118 or a mechanical switch adapted to the housing 118 to interact with a cam along the float 119. The switch 120 could be electrically connected to a control circuit to activate a motor which drives a pump 8 or directly attached to a self-contained, fully-functional pump 8.

Figure 17C:
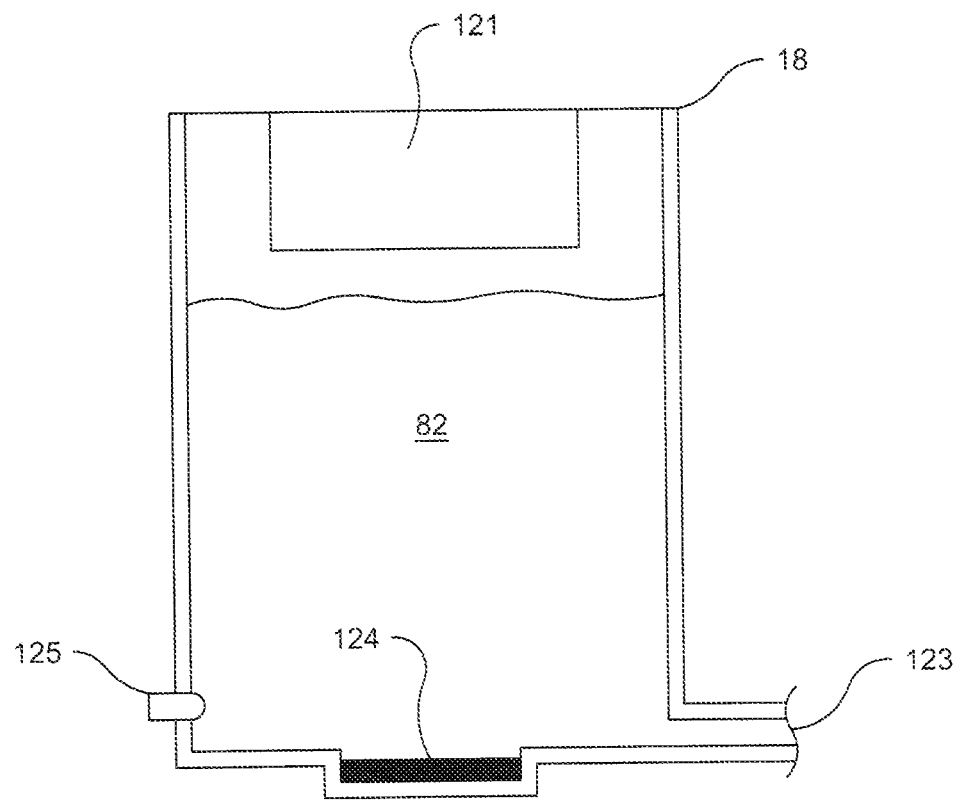
FIG. 17c is a section view illustrating reservoir with optional heater in accordance with an embodiment of the apparatus.

Referring now to FIG. 17c, a heating element 124 is shown attached at and fixed to the bottom of a reservoir 18, although the heating element 124 could reside in other locations therein. In some embodiments, the heating element 124 could be attached to the reservoir 18 adjacent to a line 123. The heating element 124 could be a resistive-type element adapted for use within a liquid 82. The line 123 could be a tube or other element allowing a liquid 82 to pass from the reservoir 18 to a pump 8. A probe 125 is also attached to the reservoir 18, preferably at the bottom thereof, so as to contact the liquid 82 within the reservoir 18. The probe 125 could be a thermistor or other element known within the art which enables temperature monitoring of the liquid 82. The probe 125 and heating element 124 could be electrically connected to a control circuit which allows the heating element 124 to be turned ON or OFF depending on temperature information from the probe 125. The reservoir 18 could include an access panel 121 allowing for refill thereof.

Figure 17D:
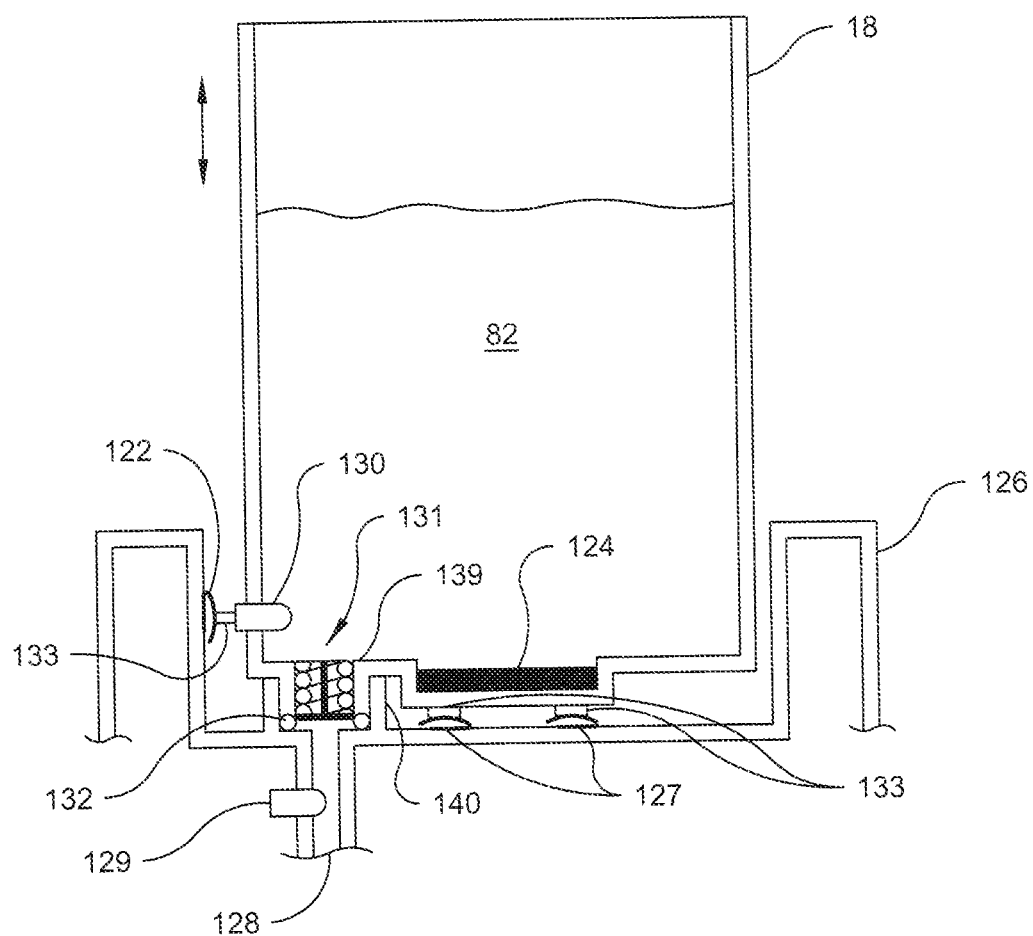
FIG. 17d is a section view illustrating removable reservoir with spring actuated valve in accordance with an embodiment of the apparatus.

Referring now to FIG. 17d, the reservoir 18 is shown including an optional probe 130 attached along one wall and contacting liquid 82 within the reservoir 18 for purposes of monitoring temperature thereof. A male connector 139 is disposed at the bottom of the reservoir 18. A spring actuated valve 131 is disposed within and attached to the male connector 139. A heating element 124 is also attached to the reservoir 18 and electrically connected to one or more contacts 133 disposed along the exterior of the reservoir 18. Connectivity between heating element 124 and contacts 133 could be via wires adapted to traverse the wall of the reservoir 18 without leakage of the liquid 82.

A female connector 140 is provided along a housing 126 so as to align with the male connector 139. The housing 126 could include structure along or projecting from the tower 3 or base 2. Contacts 127 could be provided along and attached to the housing 126 so as to align with the contacts 133. A contact 122 could be provided along and attached to the housing 126 so as to align with a contact 133 electrically communicating with the probe 130.

The reservoir 18 is seated onto the housing 126 by inserting the male connector 139 into the female connector 140. A seal ring 132 could be provided at the interface between male and female connectors 139, 140 to prevent leakage. The female connector 140 could be further attached to a line 128. The spring actuated valve 131 is depressed or otherwise actuated thereby opening the otherwise closed valve when male and female connectors 139, 140 are properly coupled. This functionality prevents the liquid 82 from freely flowing from the reservoir 18 when detached from the housing 126 but otherwise flowable from the reservoir 18 when seated onto the housing 126. Liquid 82 from the reservoir 18 passes through the male and female connectors 139, 140 into the line 128 thereafter passing to the pump 8.

When male and female connectors 139, 140 are properly connected, the contacts 133 from the heating element 124 contact the contacts 127 along the housing 126 so as to allow power to the heating element 124 and/or control commands from a control circuit. Also, the contact 133 from the probe 130 contacts the contact 122 so as to communication voltage or other informational values from the probe 130 to a control circuit or the like. In other embodiments, a probe 129 could be attached to the line 128 so as to monitor temperature of the liquid 82 after it exits the reservoir 18.

Figure 17E:
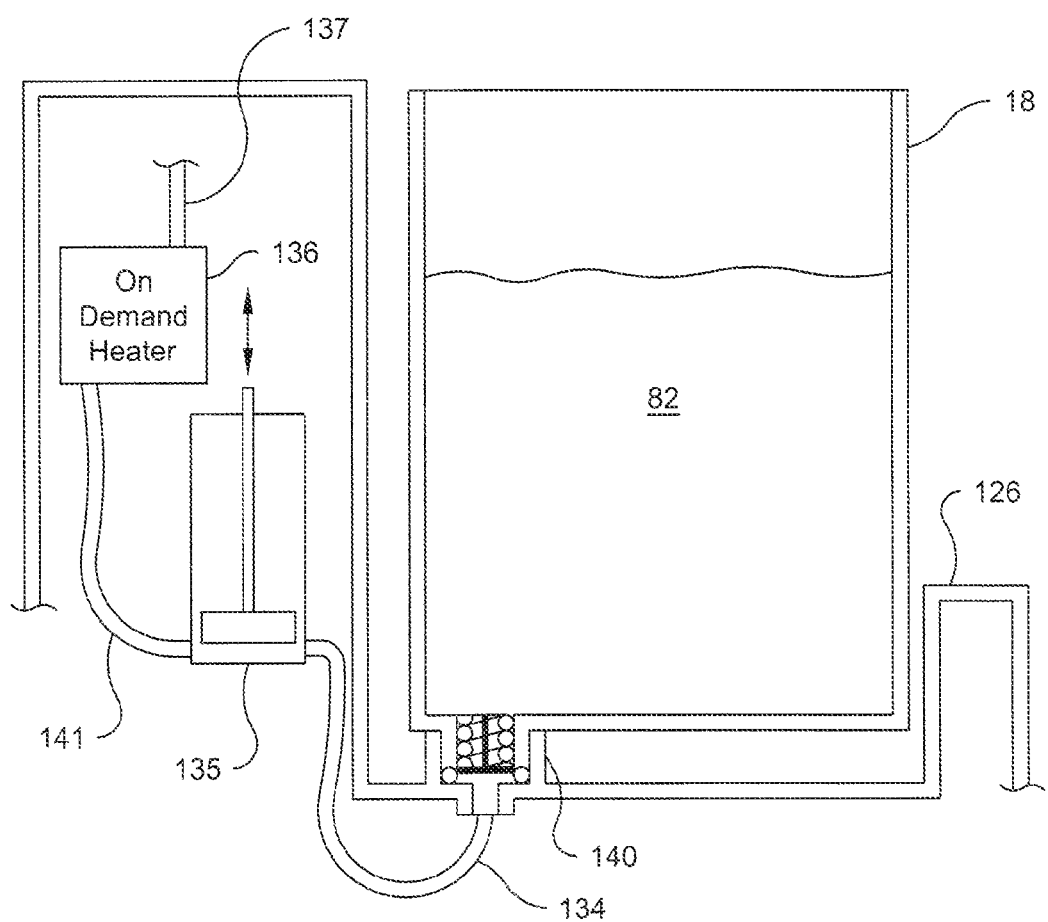
FIG. 17e is a section view illustrating removable reservoir with optional inline heater in accordance with an embodiment of the apparatus.

Referring now to FIG. 17e, a modified form of the removable reservoir 18 in FIG. 17d is shown with a line 134 attached to and communicating with the female connector 140 along the housing 126 at one end and a pump 135 at the other end. In some embodiments, the pump 8 could be a fully-functional motorized component. The pump 135 is further attached to and communicates with an external heating element 136 via a line 141. The external heating element 136 is also attached to and communicates with the funnel 5 described herein via another line 137. In this embodiment, the external heating element 136 could be an on-demand or hot-shot heater which allows for rapid heating as the liquid 82 passes through the heating element 136 prior to injection into the funnel 5. In some embodiments, the heating element 136 could be positioned before the pump 135 rather than after the pump 135 as represented in FIG. 17e.

Figure 18A:
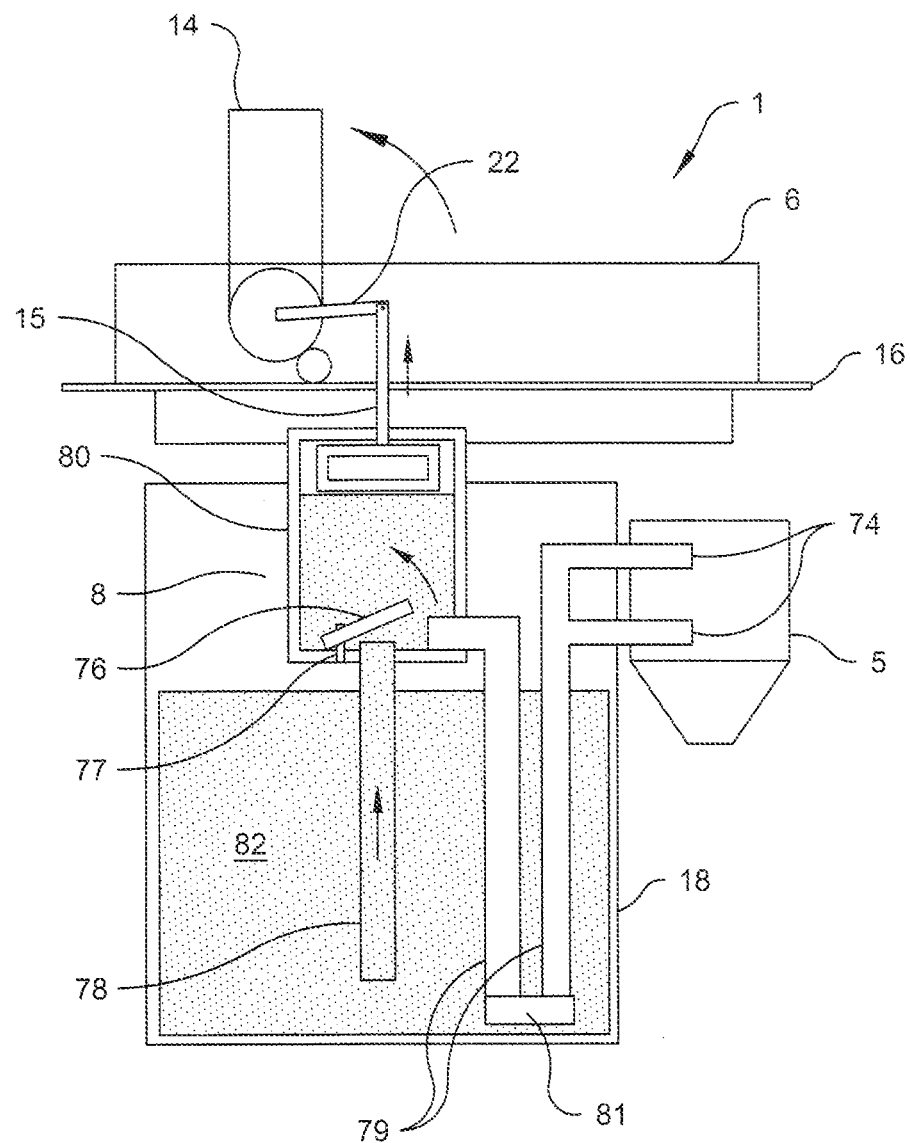
FIG. 18a is a schematic diagram illustrating functionality of a pump when rotatable handle is in the UP position in accordance with an embodiment of the apparatus.
Figure 18B:
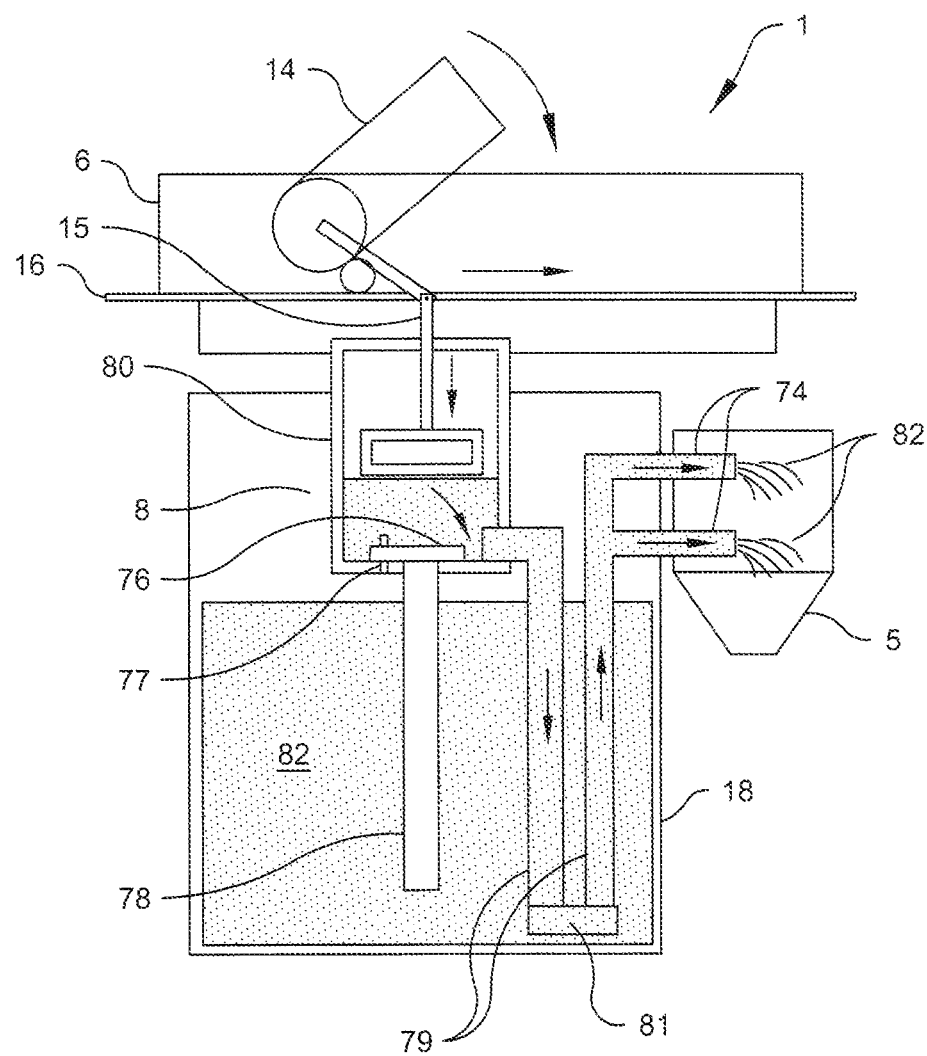
FIG. 18b is a schematic diagram illustrating functionality of a pump when rotatable handle is in the DOWN position in accordance with an embodiment of the apparatus in accordance with an embodiment of the apparatus.

Referring now to FIGS. 18a and 18b, the powder dispensing apparatus 1 is shown including a pump 8 manually actuated via a handle 14. The pump 8 includes a housing 80 defining an enclosure adapted to receive, hold, and dispense a liquid 82. A portion of the pump 8 extends into the reservoir 18. An optional inlet tube 78 could be attached to the lower end of the housing 80 so as to allow the pump 8 to communicate with liquid 82 at the bottom of the reservoir 18. An outlet tube 79 is also attached at one end to the housing 80, preferably at the lower end thereof. The other end of the outlet tube 79 is attached to the ports 74 along the funnel 5 directly or via connector ports 75, as described herein. The inlet and outlet tubes 78, 79 could be either flexible or rigid tubing. A piston 15 is slidably disposed within the housing 80 with a portion extending therefrom. The piston 15 is attached to the handle 14 via a linkage assembly 22, as otherwise described herein, so as to be extendable from and retractable into the housing 80. The functional description is also applicable to motorized embodiments with appropriate substitutions and adaptations otherwise described herein.

The piston 15 extends from the housing 80 when the handle 14 is rotated upward, as represented in FIG. 18a. As the piston 15 is extended, it generates a vacuum within the housing 80 drawing liquid 82 from the reservoir 18 into the housing 80. The lower end of the housing 80 adjacent to the inlet tube 78 could include a flapper 76 attached to the interior of the housing 80 via a fastener 77. The flapper 76 could be composed of rubber or other flexible material capable of deflecting away from the housing 80 when fluid enters the pump 8. It is also possible for the inlet tube 78 or housing 80 to include a one-way valve which allows liquid 82 to enter but not exit through the inlet tube 78. The outlet tube 79 could further include a one-way valve 81 to prevent air from entering the pump 8 when the piston 15 is extended.

The piston 15 retracts into the housing 80 when the handle 14 is rotated downward, as represented in FIG. 18b. As the piston 15 is retracted, it pressurizes the liquid 82 within the pump 8 causing the flapper 76 to cover the inlet tube 78 thereby directing the liquid 82 into the outlet tube 79. The liquid 82 traverses the outlet tube 79 and is injected into the funnel 5 via the ports 74. The liquid 82 could pass through a heating element prior to entering the funnel 5. Downward rotation of the handle 14 also causes the rotatable carriage 6 to rotate, as otherwise described herein, so as to dispense a powder 46 as liquid 82 enters the funnel 5. In some embodiments, the pump 8 could inject liquid 82 into the funnel 5 for a finite time period after powder 46 and liquid 82 are properly mixed. This functionality would allow the liquid 82 to rinse the interior of the funnel 5, thus removing residue remaining after mixing.

Figure 19A:
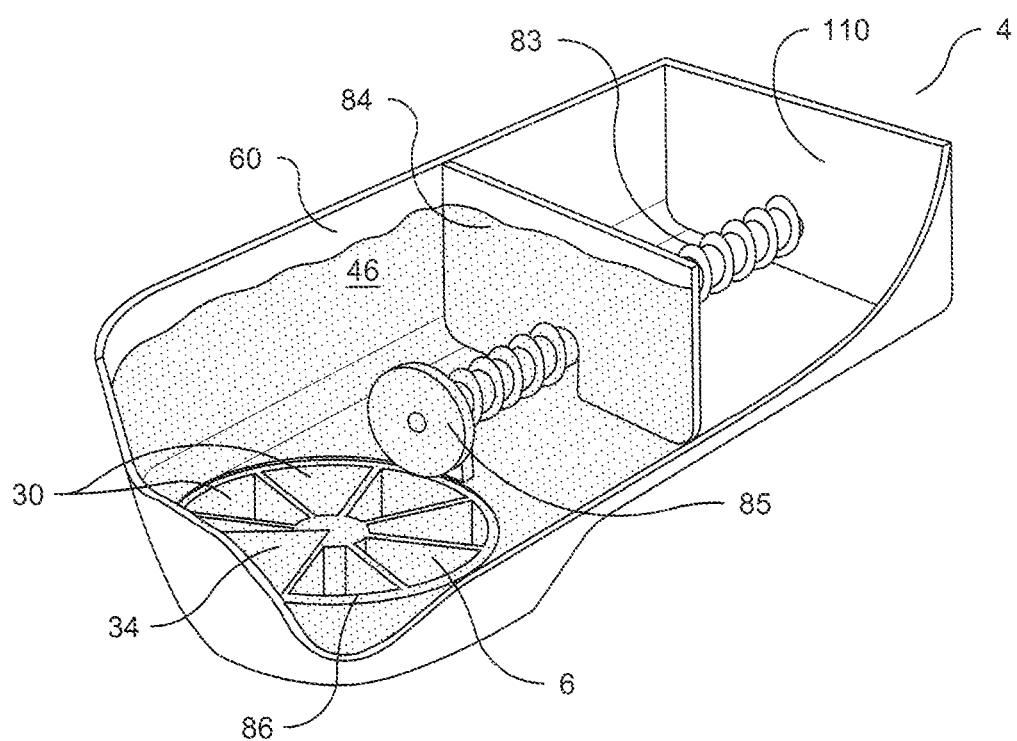
FIG. 19a is a perspective view with cutaway illustrating hopper with shaft-driven platen which causes the platen to move toward rotatable carriage causing powder to enter compartments not aligned with an opening in accordance with an embodiment of the apparatus.

Referring now to FIG. 19a, a dispenser 4 is shown including a hopper 60 with a threaded shaft 83 passing through and rotatable with respect to a wall 110. The threaded shaft 83 also passes through a platen 84. The interface between threaded shaft 83 and platen 84 enables the platen 84 to move toward and away from a rotatable carriage 6 disposed below and at one end of the hopper 60. The threaded shaft 83 could be further supported within the hopper 60 via one or more flanges. The end of the threaded shaft 83 could include a gear 85 which rotates with the threaded shaft 83. The gear 85 could contact a ring 86 along the upper surface of the rotatable carriage 6, thus allowing the gear 85 to rotate the rotatable carriage 6 when the threaded shaft 83 rotates. In some embodiments, the gear 85 and/or ring 86 could be composed of or include a rubber or other material which grabs or sticks when contacted. In other embodiments, the gear 85 and/or ring 86 could be textured or include teeth providing a complementary engagement. When the threaded shaft 83 is rotated in one direction, the platen 84 moves toward the rotatable carriage 6 pushing powder 46 within the hopper 60 into compartments 30 not contacted by a cover 34. When rotation of the threaded shaft 83 is reversed, the platen 84 moves away from the rotatable carriage 6 allowing a user to refill the hopper 60 with powder 46. In other embodiments, the rotatable carriage 6, cover 7, and/or hopper 60 could be attached to the powder dispensing apparatus 1 in a removable fashion to facilitate cleaning. In still other embodiments, the threaded shaft 83, platen 84, and ring 85 could be attached to the hopper 60 via a snap-fit arrangement which facilitates disassembly for cleaning purposes.

In some embodiments, the platen 84 could be attached to the threaded shaft 83 in a removable fashion, one example being a snap fit arrangement. A removable platen 84 would allow a user to reposition and adjust the platen 84 after cleaning or when the hopper 60 is refilled with powder 46. It is also possible for the platen 84 to be molded of a material with one or more different colors. A colored platen 84 could provide visual cues to a user as to the quantity of powder 46 residing within the hopper 60. The cover 7 described herein could be composed of a transparent material and etched with lines, numbers or other visual cues that correspond with the position of the platen 84 within the hopper 60. These visual cues could be representative of the quantity of powder 46 residing within the hopper 60.

Figure 19B:
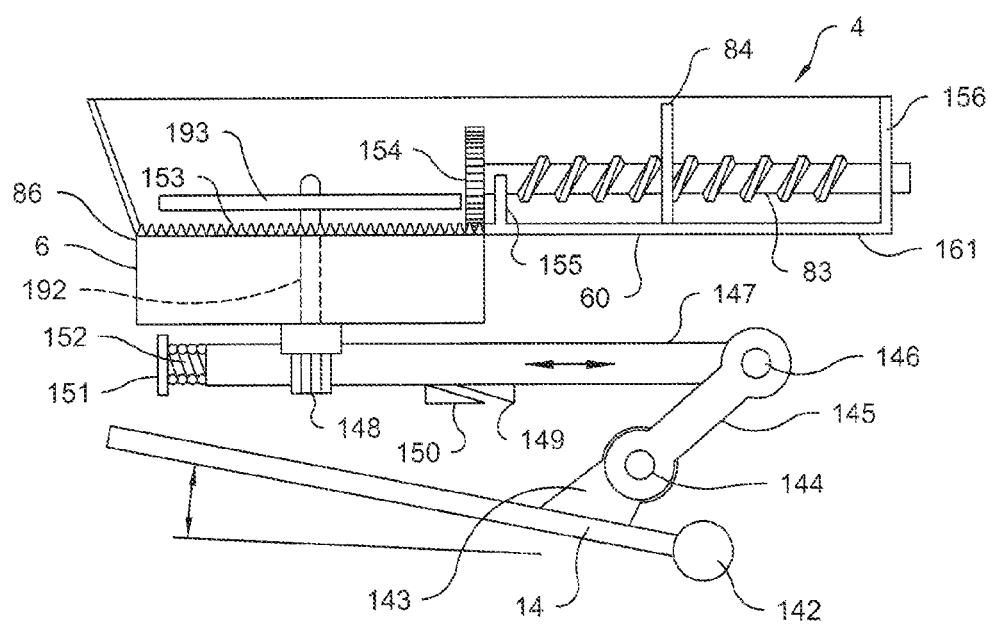
FIG. 19b is a diagram illustrating a partial cutaway side view of a mechanism enabling functionality of the threaded shaft via a rotatable handle in accordance with an embodiment of the apparatus.
Figure 19C:
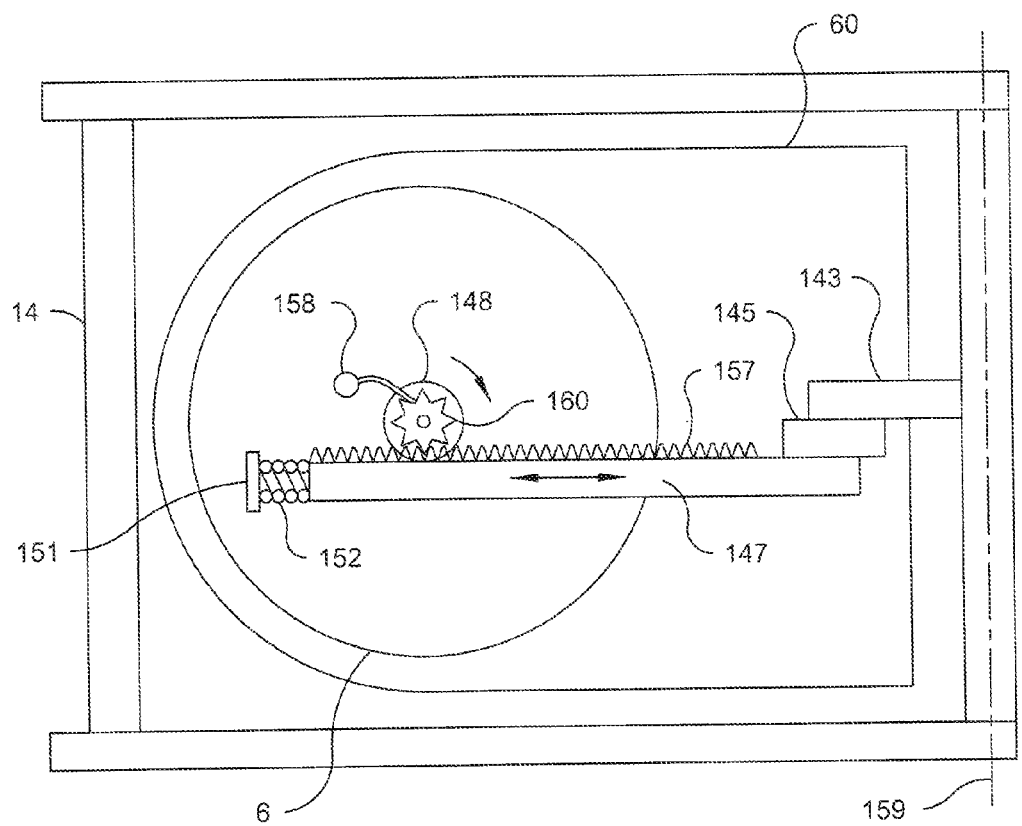
FIG. 19c is a diagram illustrating a bottom view of a mechanism enabling functionality of rotatable carriage and platen via a rotatable handle as further described in FIG. 19b.

Referring now to FIGS. 19*b* and 19*c*, the handle 14 is attached at a pivot 142, as otherwise described in FIGS. 2-4, so as to rotate about a rotational axis 159. The handle 14 could include a flange 143 which extends in a substantially upright direction. The flange 143 is loosely attached to one end of a linkage 145 via a pivot pin 144 or other similar fastener. The linkage 145 is loosely attached at a second end to a rack gear 147 via a pivot pin 146 or other similar fastener. The rack gear 147 is disposed in a horizontal arrangement parallel to the rotatable carriage 6 and hopper 60. The rotatable carriage 6 includes a carriage pinion 148 extending perpendicular from the rotatable carriage 6 and toward the rack gear 147. The carriage pinion 148 is fixed to the rotatable carriage 6 so that both elements are rotatable as a single body. The rack gear 147 further includes a plurality of teeth 157 disposed along one side thereof which contact teeth 160 along the carriage pinion 148. The far end of the rack gear 147 is attached to one end of a compression spring 152. The other end of the compression spring 152 contacts a stop 151 attached and fixed to the housing 11 within dispenser 4. The rack gear 147 also includes a rack cam 149 adjacent to a housing cam 150, the latter attached and fixed to the housing 11. In some embodiments, the carriage pinion 148 could be designed as a clutch or slip gear so as to eliminate the rack gear and cam 147, 148. The rotatable carriage 6 might also include a finger 158 fixed at one end to the rotatable carriage 6 so as to extend and contact the teeth 160. This arrangement allows the carriage pinion 148 to rotate in one direction only. In addition molded teeth used as shown by elements 68 and 69 on FIGS. 15*a*-15*b* could be shaped to eliminate the finger 158 allowing the carriage pinion 148 to rotate in one direction only.

The dispenser 4 further includes a hopper 60. A platen 84 is disposed in an upright position, preferably substantially traversing the width and height of the hopper 60. A threaded shaft 83 is further disposed along a portion of the hopper 60. One end of the threaded shaft 83 passes through a side wall 156 of the hopper 60. The other end of the threaded shaft 83 is supported along a flange 155 attached to a bottom wall 161 along the hopper 60. The threaded shaft 83 also passes through the platen 84 which is adapted to move along the threaded shaft 83 in one direction when the threaded shaft 83 is rotated clockwise and in the opposite direction when the threaded shaft 83 is rotated counter-clockwise. The threaded shaft 83 is freely rotatable at contact points with the side wall 156 and flange 155. A spur gear 154 is attached and fixed to the end of the threaded shaft 83 immediately adjacent to the flange 155.

The rotatable carriage 6 is positioned below the hopper 60 as otherwise described herein. The ring 86 along the upper side of the rotatable carriage 6 includes a crown gear 153. The teeth along the crown gear 153 contact and interact with the spur gear 154.

Downward movement of the handle 14 is communicated to the rack gear 147 via the linkage 145 causing the rack gear 147 to move horizontally toward the carriage pinion 148 compressing the compression spring 152 disposed between the rack gear 147 and stop 151. Interaction between the carriage pinion 148 and teeth 157 along the rack gear 147 causes the carriage pinion 148 and rotatable carriage 6 to rotate. Rotation of the rotatable carriage 6 is further communicated to the threaded shaft 83 via the crown gear 153 and spur gear 154 causing the platen 84 to move toward the rotatable carriage 6. When the handle 14 is fully depressed, the rack cam 149 engages the housing cam 150 allowing the rack gear 147 to disengage from the carriage pinion 148, thus allowing the compression spring 152 to push the rack gear 147 back to its starting position to reset the handle 14. Rotation of the rotatable carriage 6 positions a compartment 30 for delivery of powder 46 into the funnel 5, as further described herein.

Figure 19D:
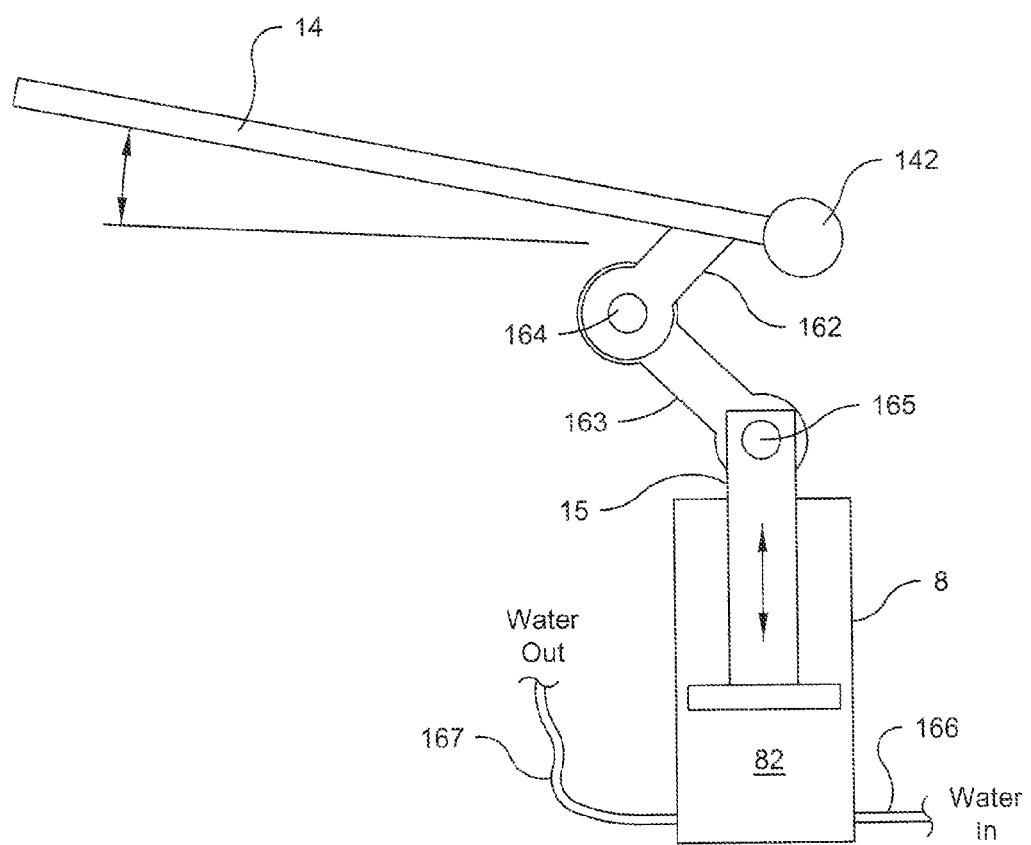
FIG. 19d is a diagram illustrating mechanism enabling functionality of the pump via a rotatable handle in accordance with an embodiment of the apparatus.
Figure 19E:
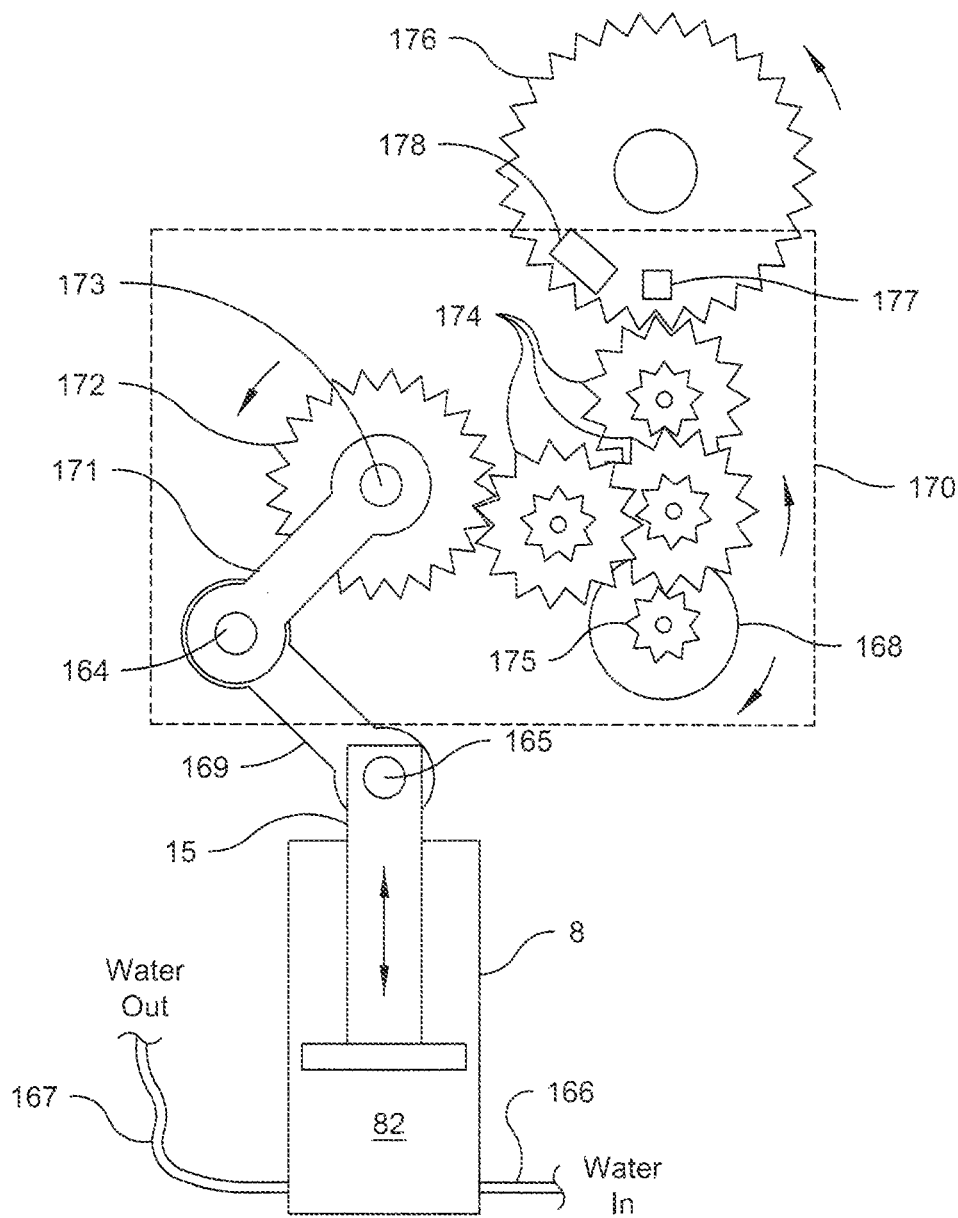
FIG. 19e is a diagram illustrating mechanism enabling functionality of rotatable carriage and platen via a motor in accordance with an embodiment of the apparatus.
Figure 19F:
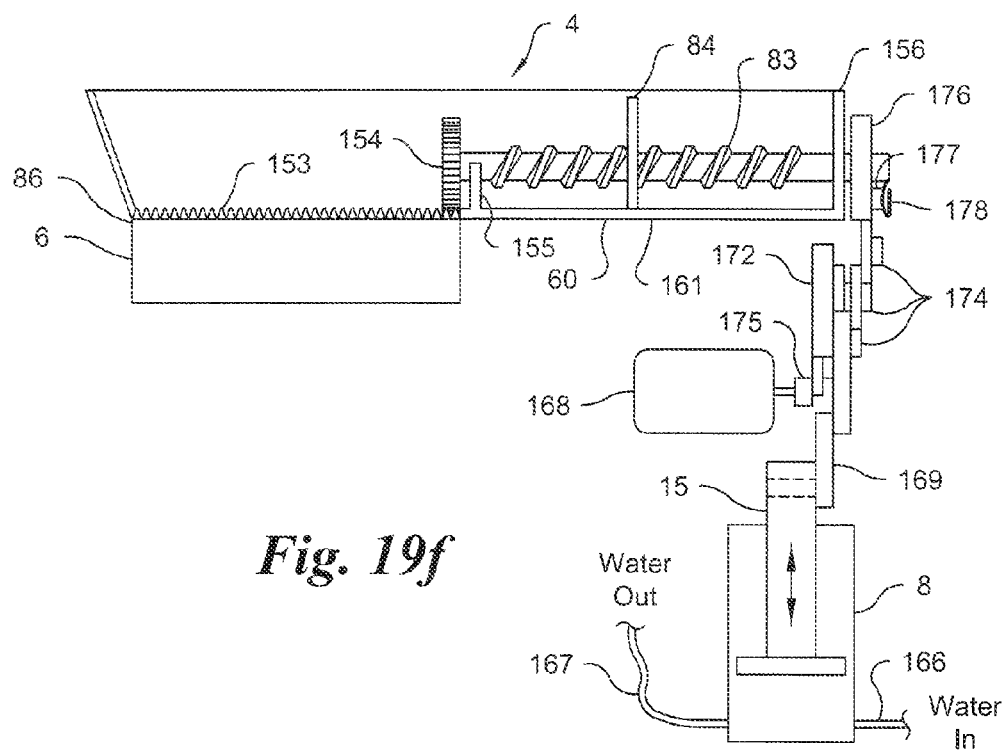
FIG. 19f is a diagram illustrating a bottom plan view of a mechanism enabling functionality of rotatable carriage and platen via a motor as further illustrated in FIG. 19e.
Figure 19G:
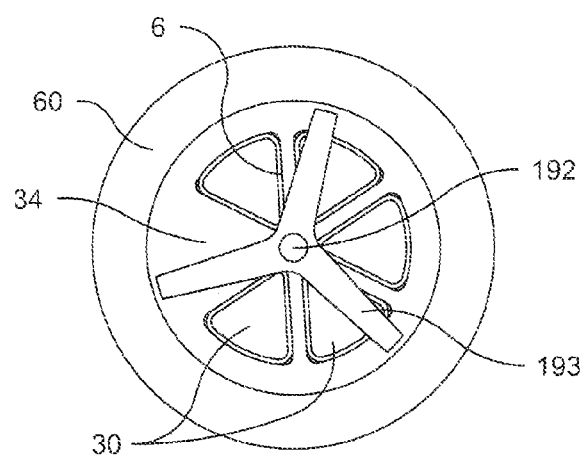
FIG. 19g is a diagram illustrating a top view of a hopper with a wand element attached to a rotatable carriage for evenly distributing powder into compartments within the rotatable carriage in accordance with an embodiment of the apparatus.

Referring now to FIGS. 19*b* and 19*g*, a shaft 192 could be fixed to the rotatable carriage 6 so as to extend vertically upward from the rotatable carriage 6 opposite of the carriage pinion 148. A wand 193 could be fixed to the upper end of the shaft 192 within the hopper 60. The wand 193 could be arranged perpendicular with respect to the shaft 192 above the rotatable carriage 6. The wand 193 rotates with the rotatable carriage 6 and carriage pinion 148. The wand 193 could include various shapes, one example being the three-arm arrangement in FIG. 19*g*. The wand 193 is positioned within the hopper 60 so as to evenly distribute powder 46 into the compartments 30.

Referring now to FIG. 19*d*, the handle 14 is attached to a pivot 142 at one end and includes a flange 162 extending substantially downward. The flange 162 is rotatably attached to one end of a linkage 163 via a pivot pin 164 or the like. The other end of the linkage 163 is rotatably attached via a pivot pin 165 to a piston 15 slidably disposed within a pump 8. The pump 8 receives a liquid 82 from a reservoir 18 via an inlet line 166 and communicates the liquid 82 to a funnel 5 via an outlet line 167, as further described herein. Downward motion of the handle 14 causes the piston 15 to move into the pump 8 causing the liquid 82 therein to flow into the outlet line 167. Upward motion of the handle causes the piston 15 to move out of the pump 8 drawing liquid 82 into the pump 8 via the inlet line 166. In some embodiments, it might be advantageous to combine the features described in FIGS. 19*b*-19*d* allowing for manual operability of both a rotatable carriage 6 and a pump 8. The travel distance of the handle 14 could be indexed to the quantity of powder 46 within each rotatable carriage 6 and capacity of liquid 82 from the pump 8 to dispense the proper ratio of powder 46 and liquid 82.

Referring now to FIGS. 19*e* and 19*f*, the piston 15 along the pump 8 shown in FIG. 19*d* is rotatably attached to one end of a linkage 169 via a pivot pin 165. The other end of the linkage 169 is rotatably attached to a second linkage 171 via a pivot pin 164. The other end of the second linkage 171 is attached and fixed to a spur gear 172 via a pivot pin 173. This arrangement ensures the linkage 171 rotates with the spur gear 172. The spur gear 172 is further attached to an arrangement of cluster gears 174 within a gearbox 170. A pinion 175 is further attached to a shaft along a reversible motor 168. One cluster gear 174 contacts the pinion 175 and another cluster gear 174 contacts a second spur gear 176 partially extending into the gearbox 170. The cluster gears 174 communicate rotation of the pinion 175 by the motor 168 to rotation of the spur gear 172 causing the piston 18 to move up or down within the pump 8 dependent in part on gear design and direction of rotation by the motor 168. The cluster gears 174 also communicate rotation of the pinion 175 to the second spur gear 176. The inlet line 166, outlet line 167, and/or pump 82 could include a one-way valve and/or flap mechanism as otherwise described for FIGS. 18*a*-18*b*.

The hopper 60 described in FIGS. 19*c* and 19*d* includes a threaded shaft 83 which partially traverses the hopper 60. One end of the threaded shaft 83 passes through and extends from the side wall 156. The other end of the threaded shaft 83 is supported by a flange 155 extending upright from the bottom wall 161. A spur gear 154 is attached and fixed to the threaded shaft 83 at one end. A rotatable carriage 6 is disposed below and rotatable with respect to the hopper 60. The spur gear 154 communicates with a crown gear 153 disposed along the ring 86 along the upper side of the rotatable carriage 6. A threaded shaft 83 passes through a platen 84 which is adapted to move forward and backward along the threaded shaft 83 depending on the rotational direction. The end of the threaded shaft 83 extending beyond the side wall 156 is attached and fixed to the spur gear 176. This arrangement allows the spur gear 176 to rotate the shaft 83 which in turn rotates the rotatable carriage 6 via the spur gear 154 and crown gear 153.

In some embodiments, the linkage mechanism between pump 8 and rotatable dispenser 6 could include a sensor mechanism for determining and controlling the quantity of powder 46 and liquid 82 dispensed into a container 63. One exemplary sensor mechanism could include a paired arrangement of contacts 177, 178.

A spur gear 176 could include one or more contacts 177 indexed with the compartments 30 and/or flow rate from or quantity of liquid 82 dispensed by the pump 8. A contact 178 could be attached to the dispenser 4 or within the gearbox 170 and positioned to touch or interact with the contacts 177 as the spur gear 176 rotates. The contacts 177, 178 could be composed of a conductive metal which makes and breaks a circuit so as to allow a control circuit to determine the quantity of liquid 82 and powder 46 dispensed into a container 63. In one non-limiting example, a single contact 177 could be disposed along a spur gear 176. The contacts 177, 178 could touch once per complete revolution of the spur gear 176 indicating that powder 46 from one compartment 30 is dispensed into the funnel 5 and liquid 82 is injected into the funnel 5 consistent with one fill/discharge cycle by the pump 8. The control circuit could control the ON and OFF functionality of the motor 168 to accurately control the quantity of powder 46 and liquid 82 dispensed. Other designs are possible allowing for an infinite number of powder-to-liquid ratios.

While FIGS. 19e and 19f describe a motorized embodiment capable of driving both pump 8 and rotatable carriage 6, it is also possible for the motor 168 to drive either only the pump 8 or only the rotatable carriage 6.

Figure 20A:
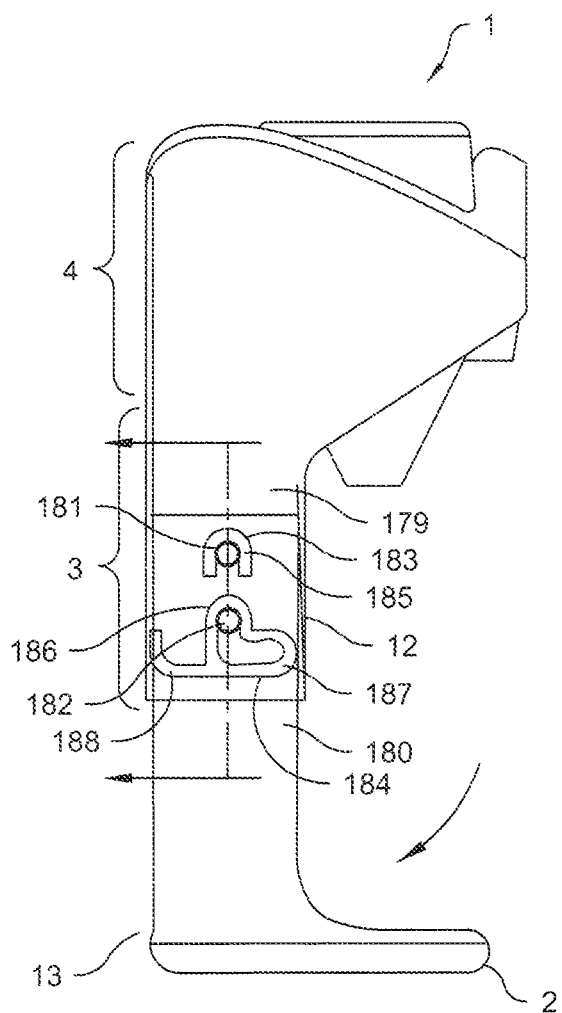
FIG. 20a is a side view with partial cutaway illustrating powder dispensing apparatus with foldable base extended in the upright position in accordance with an embodiment of the apparatus.
Figure 20B:
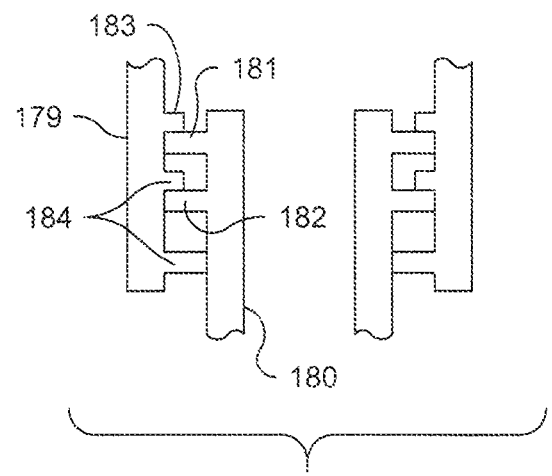
Figure 20C:
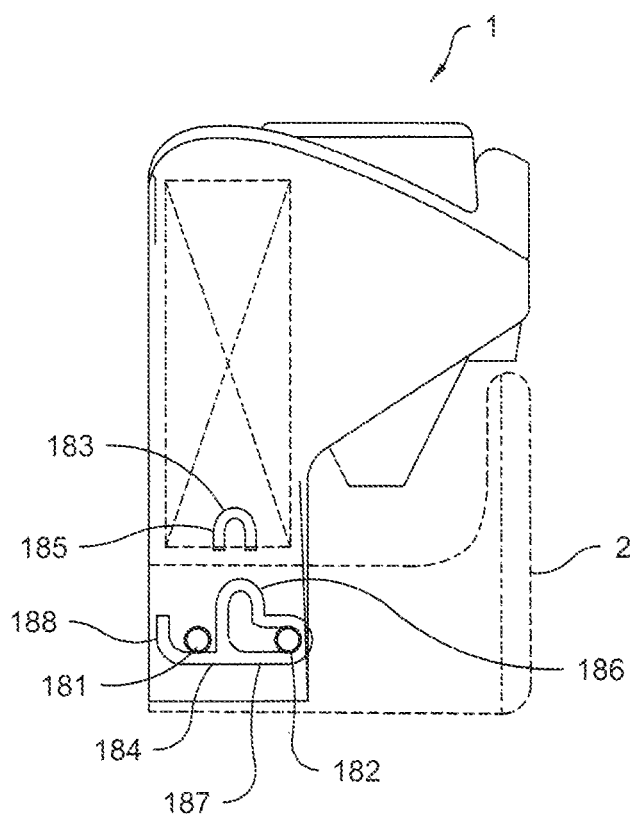

Referring now to FIGS. 20a-20c, the powder dispensing apparatus 1 is shown including a substantially L-shaped base 2 attached to a tower 3 and dispenser 4. The housing 13 along the base 2 includes a pair of walls 180. The housing 12 along the tower 3 also includes a pair of walls 179. Each wall 180 includes a pair of bosses 181, 182 which extend outward in a substantially perpendicular fashion. Each boss 181, 182 could have a circular cross section as illustrated in FIGS. 20a and 20c. Each wall 179 includes a pair of tracks 183, 184 which extend inward. The tracks 183, 184 are flange-like elements which extend from the inner surface of each wall 179. The top most track 183 is preferred to be U-shaped structure 185 opening downward. The bottom most track 184 includes a pair of intersecting U-shaped structures 186, 187 with an L-shaped structure 188 extending from end one. In preferred embodiments, the bosses 181, 182 extend toward and contact the inner surface of the wall 179, yet remain slidable with respect thereto. Also, a portion of one or both tracks 183, 184 could extend toward and contact the outer surface of the wall 180, yet slidable with respect thereto.

The base 2 is positioned and locked in an upright position by positioning the boss 181 so that it resides within and contacts the U-shaped structure 185 and the other boss 182 so that it resides within and contacts the U-shaped structure 186, as represented in FIGS. 20a and 20b. The base 2 in positioned and locked in a folded position by pulling the base 2 downward to release the bosses 181, 182 from the respective U-shaped structures 185, 186. Next, the base 2 is rotated counter-clockwise as represented in FIG. 20c and pulled to the right so the boss 181 now contacts the L-shaped structure 188 and the other boss 182 now contacts the U-shaped structure 187. The base 2 is extended to the upright position again by pushing the base 2 to the left and rotating the base 2 clockwise so as to align the bosses 181, 182 with the respective U-shaped structures 185, 186. Next, the base 2 is pushed up into the tower 3 locking the bosses 181, 182 into the respective U-shaped structures 185, 186. A molded spring detent or compression spring with cap could be used to provide a firm stop and an audio cue to the user signaling folded and upright positions.

Figure 21:
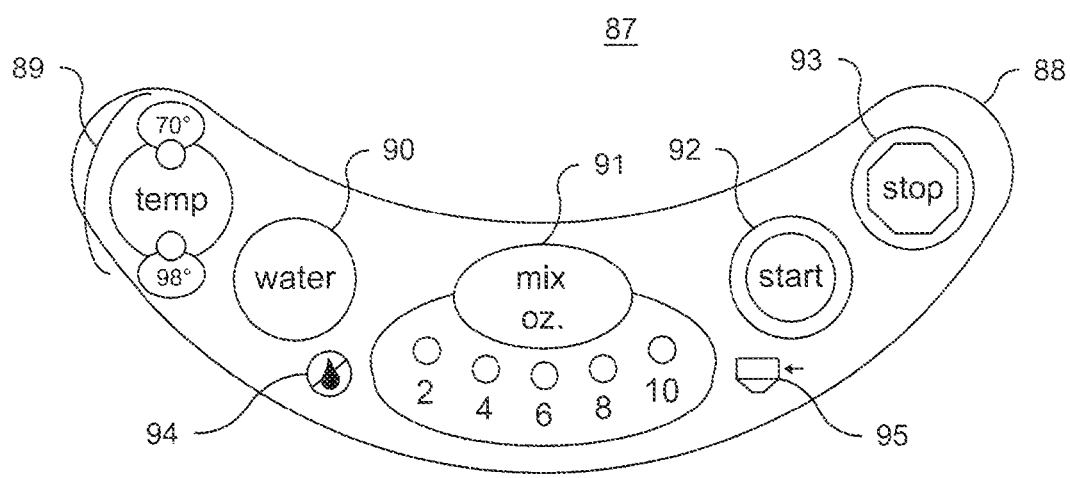
FIG. 21 is a top view illustrating a control panel disposed along an exterior surface of a powder dispensing apparatus in accordance with an embodiment of the apparatus.

Referring now to FIG. 21, an exemplary control panel 88 is shown for controlling electrically powered components within the powder dispensing apparatus 1. The control panel 88 could be mounted along an exterior surface 87 disposed along the base 2, tower 3, or dispenser 4.

The control panel 88 could include a variety of options which enable a user to select and deselect functionality of the powder dispensing apparatus 1. In one example, temperature selectors 89 could allow a user to select the temperature of liquid 82 dispensed into a container 63. In another example, a water selector 90 could allow a user to select or deselect injection of a liquid 82 from a reservoir 18 into the funnel 5. In yet another example, quantity selectors 91 could allow a user to select the amount of liquid 82 dispensed into a container 63. In still another example, a start selector 92 could allow a user to power the powder dispensing apparatus 1 and a stop selector 93 could allow a user to terminate power to or interrupt functionality of the powder dispensing apparatus 1. Selectors could include touch sensitive buttons or switches with or without backlighting or light indicators.

The control panel 88 could further include a variety of indicator elements which communicate information to a user. In one example, a water level indicator 94 could direct a user to add more liquid 82 to a reservoir 18. In another example, a funnel indicator 95 could direct a user to attach a funnel 5 to the powder dispensing apparatus 1 or check to determine whether a funnel 5 is properly seated within the dispenser 4. Other indicators which relate to safety and performance are likewise applicable to the powder dispensing apparatus 1. Indicator elements could include a polymer sheet with one or more symbols displayable when backlit by a light element.

Figure 22:
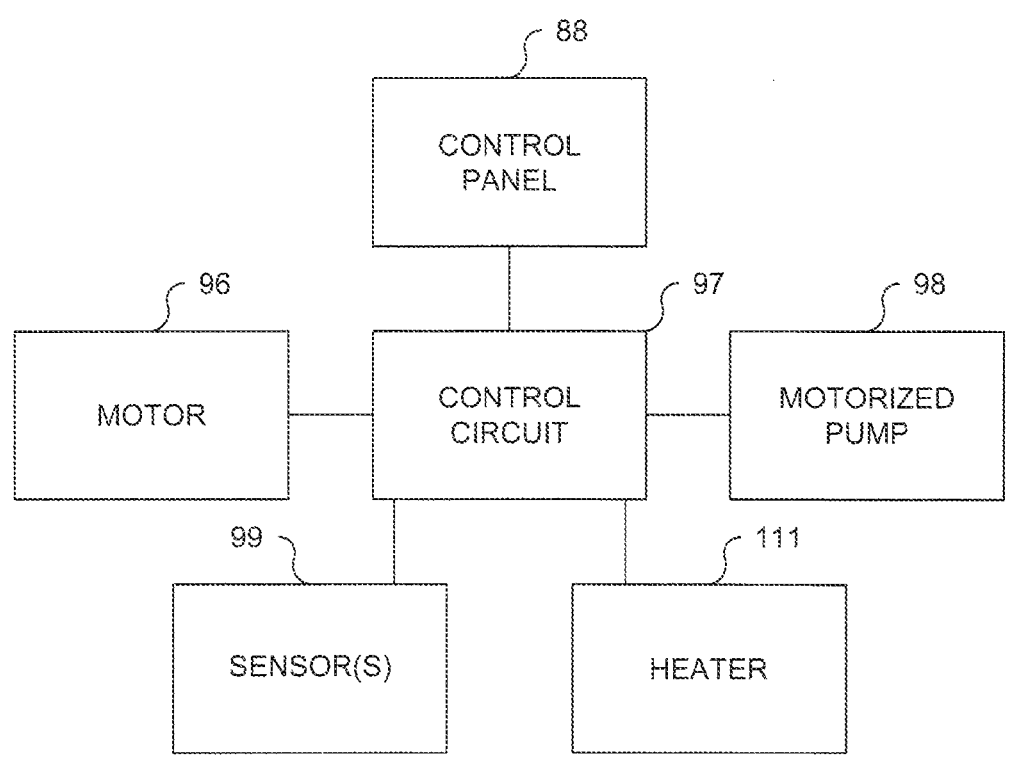
FIG. 22 is a block diagram illustrating communication between control panel, controller circuit, motor, sensors and pump elements within a powder dispensing apparatus in accordance with an embodiment of the apparatus.

Referring now to FIG. 22, the control panel 88 could electrically communicate with a control circuit 97. The control circuit 97 could further communicate with electrically powered elements within the powder dispensing apparatus 1. For example, the control circuit 97 could communicate power and/or control commands to a motor 96 for purposes of controlling functionality of the rotatable carriage 6 and/or pump 8. In another example, the control circuit 97 could communicate power and/or control commands directly to a motorized pump 98. In yet another example, the control circuit 97 could communicate power and/or control commands to a heater 111 for purposes of controlling heating of a liquid 82. In still other examples, the control circuit 97 could receive and process information from a variety of sensors 99 including, but not limited to, a temperature sensor communicating with a liquid 82, a water level sensor within a reservoir 18, a sensor 113 within the dispenser 4 which determines whether the funnel 5 is property seated therein, or the sensor mechanism comprising the contacts 177, 178 shown in FIGS. 19e and 19d. Information from the temperature sensor could be used to determine ON and OFF functionality of the heater 111. Information from the water level sensor could be used to prevent the motor 96 or motorized pump 98 from functioning in order to control the quality of the mixture dispensed into the container 63 or to avoid damage to the powder dispensing apparatus 1 or component(s) thereof. Information from the water level sensor could also be used to actuate the water level indicator 94. Information from the sensor 113 adjacent to the funnel 5 could be used to actuate the funnel indicator 95. Information from the contacts 177, 178 could be used to determine ON and OFF functionality of a motor 168.

As is evident from the explanation above, the described invention provides a fully-integrated dispensing apparatus applicable to food preparation. Accordingly, the described invention is expected to be sold by retailers and the like to shoppers who require the convenience of a powder dispenser examples including, but not limited to, persons having a family member with special feeding needs.

The description above indicates that a great degree of flexibility is offered in terms of the present invention. Although systems and methods have been described in considerable detail with reference to certain preferred versions thereof, other versions are possible. Therefore, the spirit and scope of the appended claims should not be limited to the description of the preferred versions contained herein.

What is claimed is:

1. A powder dispensing apparatus comprising:
   (a) a base adapted for receiving a container;
   (b) a dispenser including a rotatable carriage contacting a support element with an opening, said rotatable carriage including a plurality of compartments, said rotatable carriage rotatable about a central axis, a hopper disposed above said rotatable carriage and communicating with less than all said compartments, each said compartment capable of separately dispensing a powder from said hopper through said opening into said container resting on said base;
   (c) a tower disposed between and attached to said base and said dispenser;
   (d) a funnel disposed below said support element opposite of said rotatable carriage, said funnel aligned with said container, said funnel fixedly or removably attached to said dispenser;
   (e) a reservoir attached to said powder dispensing apparatus and adapted to store a liquid;
   (f) a pump communicating with said reservoir and said funnel, said pump configured to move said liquid from said reservoir into said funnel as said rotatable carriage dispenses said powder into said funnel for mixing therein; and
   (g) a motor or a rotatable handle attached to said powder dispensing apparatus and configured to rotate said rotatable carriage and to operate said pump, a mechanical linkage attached to said motor or said rotatable handle and configured to dispense said liquid and said powder according to a specific ratio.

2. The powder dispensing apparatus of claim 1, further comprising:
   (h) a control panel disposed along an exterior surface of said powder dispensing apparatus and configured to electrically communicate with said motor for control purposes.

3. The powder dispensing apparatus of claim 1, wherein each said compartment includes a rotatable paddle disposed along said compartment, said rotatable paddle attached and rotatable with respect to said compartment, said rotatable paddle rotates to an OPEN position when positioned above said opening so release said powder into said container.

4. The powder dispensing apparatus of claim 1, wherein said rotatable carriage shakes during rotation to release said powder from said compartment aligned with said opening.

5. The powder dispensing apparatus of claim 4, wherein said rotatable carriage includes a plurality of first nubs which interact with at least one second nub along said dispenser so as to shake said rotatable carriage.

6. The powder dispensing apparatus of claim 5, wherein each said compartment is separately disposed and attached to a live hinge adjacent to said central axis, said live hinge allows only one said compartment to shake when said first nubs interact with said at least one second nub.

7. The powder dispensing apparatus of claim 1, wherein said dispenser includes a threaded shaft attached to and rotatable with respect to said hopper and a platen movable along said threaded shaft, said platen configured to feed said powder into said compartments when said threaded shaft rotates, said threaded shaft having a gear adjacent to said rotatable carriage, said gear engages a ring along said rotatable carriage so as to rotate said threaded shaft when said rotatable carriage rotates.

8. The powder dispensing apparatus of claim 7,
   wherein said a rotatable handle configured to move said platen.

9. The powder dispensing apparatus of claim 7, further comprising:
   wherein said motor configured to move said platen.

10. The powder dispensing apparatus of claim 1, wherein a wand is attached to said rotatable carriage, said wand disposed within said hopper and configured to distribute said powder into said rotatable carriage.

11. The powder dispensing apparatus of claim 7, wherein said hopper, said rotatable carriage, said threaded shaft, or said platen are removable from said dispenser.

12. The powder dispensing apparatus of claim 1, wherein said funnel includes at least one port which direct(s) said liquid into said funnel to mix said liquid with said powder or to rinse said funnel after said liquid and said powder are mixed.

13. The powder dispensing apparatus of claim 1, wherein said mechanical linkage includes a paired arrangement of contacts configured to control quantity of each of said liquid and said powder dispensed into said container.

14. The powder dispensing apparatus of claim 13, further comprising:
   (h) a control panel disposed along an exterior surface of said powder dispensing apparatus and configured to communicate with said motor for control purposes.

15. The powder dispensing apparatus of claim 1, further comprising:
   (h) a heating element disposed within said powder dispensing apparatus and configured to heat said liquid prior to mixing with said powder.

16. The powder dispensing apparatus of claim 15, further comprising:
   (i) a control panel disposed along an exterior surface of said powder dispensing apparatus and configured to communicate with said heating element for control purposes.

17. The powder dispensing apparatus of claim 15, further comprising:
   (i) at least one sensor disposed within said powder dispensing apparatus and configured for purpose of regulating heating of said liquid.

18. The powder dispensing apparatus of claim 1, wherein said reservoir is insulated.

19. The powder dispensing apparatus of claim 1, further comprising:

(h) at least one sensor disposed within said reservoir and configured to prevent operability of said motor when said liquid within said reservoir is below a predetermined level.

20. The powder dispensing apparatus of claim 1, wherein said reservoir is removably attached to said powder dispensing apparatus.

21. The powder dispensing apparatus of claim 1, wherein said base is foldable with respect to said tower.

22. A powder dispensing apparatus comprising:
(a) a base adapted for receiving a container;
(b) a dispenser including a rotatable carriage contacting a support element with an opening, said rotatable carriage including a plurality of compartments, said rotatable carriage rotatable about a central axis, a hopper disposed above said rotatable carriage and communicating with less than all said compartments, each said compartment capable of separately dispensing a powder from said hopper through said opening into said container resting on said base;
(c) a tower disposed between and attached to said base and said dispenser;
(d) a funnel disposed below said support element opposite of said rotatable carriage, said funnel aligned with said container;
(e) a reservoir attached to said powder dispensing apparatus and adapted to store a liquid;
(f) a motorized pump communicating with said reservoir and said funnel, said motorized pump configured to move said liquid from said reservoir into said funnel as said rotatable carriage dispenses said powder into said funnel for mixing therein; and
(g) a motor attached to said powder dispensing apparatus and configured to rotate said rotatable carriage, a mechanical linkage attached to said motor and configured to dispense said liquid and said powder according to a specific ratio.

23. The powder dispensing apparatus of claim 22, wherein said mechanical linkage includes a sensor mechanism which determines and controls quantity of said powder and said liquid dispensed into said container.

24. The powder dispensing apparatus of claim 23, wherein said sensor mechanism includes a pair of contacts composed of a conductive metal which makes and breaks a circuit so as to allow a control circuit to determine quantity of said liquid and said powder dispensed into said container.

* * * * *

UNITED STATES PATENT AND TRADEMARK OFFICE
CERTIFICATE OF CORRECTION

| | | |
|---|---|---|
| PATENT NO. | : 8,584,901 B2 | |
| APPLICATION NO. | : 13/521929 | |
| DATED | : November 19, 2013 | |
| INVENTOR(S) | : Christopher Dooley et al. | |

It is certified that error appears in the above-identified patent and that said Letters Patent is hereby corrected as shown below:

In the Claims

Col. 23, line 64 - delete "so" and insert --to--

Col. 24, line 20 - delete "a"

Col. 24, lines 22-23 - delete "further comprising:"

Signed and Sealed this
Fifteenth Day of April, 2014

Michelle K. Lee
*Deputy Director of the United States Patent and Trademark Office*